United States Patent
Byrne et al.

(10) Patent No.: US 10,174,169 B2
(45) Date of Patent: Jan. 8, 2019

(54) MOISTURE CURABLE COMPOUND WITH METAL-ARENE COMPLEXES

(71) Applicant: Momentive Performance Materials Inc., Waterford, NY (US)

(72) Inventors: Christopher Michael Byrne, Clifton Park, NY (US); Anantharaman Dhanabalan, Bangalore (IN); Sumi Dinkar, Bangalore (IN); George Samuels, Clifton Park, NY (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 15/039,604

(22) PCT Filed: Nov. 26, 2014

(86) PCT No.: PCT/US2014/067521
§ 371 (c)(1),
(2) Date: May 26, 2016

(87) PCT Pub. No.: WO2015/081146
PCT Pub. Date: Jun. 4, 2015

(65) Prior Publication Data
US 2017/0260335 A1 Sep. 14, 2017

Related U.S. Application Data

(60) Provisional application No. 61/909,056, filed on Nov. 26, 2013.

(51) Int. Cl.
| | |
|---|---|
| C08G 77/08 | (2006.01) |
| C08G 77/02 | (2006.01) |
| C08K 5/56 | (2006.01) |
| C08L 83/04 | (2006.01) |
| C08G 77/16 | (2006.01) |
| C08K 5/544 | (2006.01) |

(52) U.S. Cl.
CPC ............. *C08G 77/08* (2013.01); *C08G 77/02* (2013.01); *C08G 77/16* (2013.01); *C08K 5/544* (2013.01); *C08K 5/56* (2013.01); *C08L 83/04* (2013.01)

(58) Field of Classification Search
CPC ........ C08G 77/08; C08G 77/18; C08L 101/10
See application file for complete search history.

(56) References Cited

U.S. PATENT DOCUMENTS

| | | | |
|---|---|---|---|
| 3,632,557 A | 1/1972 | Brode et al. | |
| 3,672,722 A | 6/1972 | Murcott | |
| 3,786,081 A | 1/1974 | Leibold et al. | |
| 3,971,751 A | 7/1976 | Isayama et al. | |
| 4,293,597 A | 10/1981 | Bessmer et al. | |
| 4,345,053 A | 8/1982 | Rizk et al. | |
| 4,461,867 A | 7/1984 | Suprenant | |
| 4,481,367 A | 11/1984 | Knopf | |
| 4,625,012 A | 11/1986 | Rizk et al. | |
| 4,985,491 A | 1/1991 | Reisch | |
| 5,623,044 A | 4/1997 | Chiao | |
| 5,852,137 A | 12/1998 | Hsieh et al. | |
| 5,891,978 A | 4/1999 | Brown et al. | |
| 5,919,888 A | 7/1999 | Lawrey et al. | |
| 6,197,912 B1 | 3/2001 | Huang et al. | |
| 6,207,794 B1 | 3/2001 | Yamasaki et al. | |
| 6,303,731 B1 | 10/2001 | Carlson et al. | |
| 6,310,170 B1 | 10/2001 | Johnston et al. | |
| 6,359,101 B1 | 3/2002 | O'Conno et al. | |
| 6,515,164 B1 | 2/2003 | Bolet et al. | |
| 6,833,423 B2 | 12/2004 | Roesler et al. | |
| 7,569,653 B2 | 8/2009 | Landon | |
| 9,523,002 B2 | 12/2016 | Dinkar | |
| 2002/0198352 A1 | 12/2002 | Tanaka et al. | |
| 2004/0122253 A1 | 6/2004 | Smith et al. | |
| 2005/0020706 A1 | 1/2005 | Kolbach et al. | |
| 2009/0171056 A1* | 7/2009 | Hofmann | C07F 17/02 528/15 |
| 2011/0021684 A1 | 1/2011 | Maliverney et al. | |
| 2011/0098420 A1 | 4/2011 | Takizawa et al. | |
| 2014/0378612 A1 | 12/2014 | Dinkar | |

FOREIGN PATENT DOCUMENTS

| | | |
|---|---|---|
| WO | 2012033886 A1 | 3/2012 |
| WO | 2013101755 A2 | 7/2013 |
| WO | 2013165552 A1 | 11/2013 |

OTHER PUBLICATIONS

ISA/US, International Search Report and Written Opinion prepared for PCT/US2014/067521 dated Apr. 15, 2015.
Smith J. A., et al., "ANSA-Metallocene Derivatives, III*.Influence of an Interannular Ethylene Bridge on the Reactivity of Titanocene Derivatives," J. Organomet. Chem., 218 (2) (1981) 159-167.
Gomez-Ruiz, et al., "Study of the cytotoxic activity of alkenyl-subsituted ansa-titanocene complexes," J., Inorg. Chem. Comm. 2007, 10, 748-752.
Martinez G., et al., "Group 4 metallocene complexes with non-bridged and tetramethyldisilozane-bridged methyl-phenyl-cyclopentradienyl ligands: synthesis, characterization and olefin polymerization studies," J. Organomet. Chem. 689 (24) (2004) 4395-4406.
Gasser, G., et al., "Organometallic Anticancer Compounds," J. Med. Chem. 2011, 54, 3-25.
Noviandri, I. et al, "The Decamethylferrocenium/Decamethylferrocene Redox Couple: A Superior Redox Standard to the Ferrocenium/Ferrocen Redox Couple for Studying Solvent Effects on the Thermodynamics of Electron Transfer," J. Phys. Chem., 1999, 103, 6713-6722.

(Continued)

*Primary Examiner* — Kuo Liang Peng
(74) *Attorney, Agent, or Firm* — McDonald Hopkins LLC; Joseph Waters

(57) ABSTRACT

The present invention provides curable compositions comprising non-tin metal accelerators that accelerate the condensation curing of moisture-curable silicones/non-silicones. In particular, the present invention provides an accelerator comprising metal-arene complexes that are suitable as replacements for organotin in sealant and RTV formulations.

22 Claims, No Drawings

(56) References Cited

OTHER PUBLICATIONS

Pigge, F. Christopher, et al., "Stoichiometric Applications of n6-Arene Ruthenium(II) Complexes in Organic Chemistry," J., Curr. Org. Chem., 2001, 5, 757-784.

Lara S. B., "Design, Synthesis, and Activation of Ruthenium Arene Anti-cancer Complexes," Ph.D. Thesis, University of Warwick, 2010.

Koph, H. et al., "Titanocen Dichloride—The First Metallocene with Cancerostatic Activity," Angew. Chem., Int. Ed. Engl., 1979, 18, 477-478.

Hernandez R., et al., "Titanium(IV) complexes: Cytotoxicity and cellular updake of titanium(IV) complexes on caco-2 cell line," Toxicology in Vitro, 2010, 24, 178-183.

Mokdsi, G., et al., "Water soluble, hydrolytically stable derivatives of the antitumor drug titanocen dichloride and binding studies with nucleotides," J. Organomet. Chem. 1998, 565, 29-35.

Vinklarek, J., et al., "Interaction of the antitumor agent vanadocene dichloride with phosphate buffered saline," J., Inorg. Chim. Acta, 2004, 357, 3765-3769.

Waern J. B., et al., "Bioorganometallic chemistry of molybdocne dichloride," J. Organomet. Chem., 2004, 689, 4655-4668.

Harding, M. M., et al., "Organometallic Anticancer Agents. 2. Aqueous Chemistry and Interaction of Niobocene Dichloride with Nucleic Acid Constituents and Amino Acids," J. Med. Chem. 1996, 39, 5012-5016.

Niu, H., et al., "Cp2TiCl2 used as a catalyst for the transesterification between dimethyl carbonate and phenol to diphenyl carbonate," J. Mol. Cat. A: Chem. 235 (2005) 240-243.

\* cited by examiner

MOISTURE CURABLE COMPOUND WITH METAL-ARENE COMPLEXES

CROSS REFERENCE TO RELATED APPLICATIONS

The present application claims priority to and the benefit of International Application No. PCT/US2014/067521, titled "Moisture Curable Compound with Metal-Arene Complexes", filed on Nov. 26, 2014, which claims priority to and the benefit of U.S. Provisional Patent Application No. 61/909,056 filed on Nov. 26, 2013 and titled "Moisture Curable Compound with Metal-Arene Complexes," the entire disclosure of each of which is incorporated herein by reference in its entirety.

FIELD

The present invention relates to curable compositions comprising curable polymers having reactive, silyl groups and a condensation catalyst comprising metal-arene complexes. In particular, the present invention provides curable compositions comprising metal-arene complexes as alternatives to organotin catalysts.

BACKGROUND

Moisture curable compositions crosslink upon exposure to moisture, typically atmospheric, to give cured materials that find applications as adhesives, sealants, potting materials for electronics, optical materials, components of light-emitting devices, silicone foams, weatherstrip coatings, and paper release coatings. These compositions comprise polyorganosiloxanes and non-silicone polymers having moisture-reactive groups, such as alkoxysilyl groups. The curing of such moisture-curable compositions is catalyzed by metal complexes, including compounds employing metals such as Sn, Ti, or Zn, and non-metal-based catalysts, such as amines, amidines, and guanidines. Organotin compounds such as for example dibutyltin dilaurate (DBTDL) are widely used as condensation cure catalysts to accelerate the moisture-assisted curing of a number of different polyorganosiloxanes and non-silicone polymers having reactive silyl groups.

The cure chemistry of these moisture-curable compositions can vary based upon the nature of the polymers and their moisture-curable groups. For example, alkoxysilyl groups first hydrolyze to give silanol functionalities, which then condense with the extrusion of water to give the siloxane network. Such compositions typically comprise an alkoxysilyl- or silanol-functional polymer and a crosslinking agent. Tri- and tetraalkoxysilanes are commonly used as crosslinking agents and will react with water or directly with silanol groups to crosslink the system. However, for compositions comprising hydridosilyl groups or both hydridosilyl and silanol functionalities, such a crosslinking agent is not required. In fact, due to the multitude of hydridosilyl groups present, the hydridosilyl-containing compound is often referred to as the crosslinking agent. In these compositions, hydridosilyl groups may react with water to give silanol functionalities or they may react directly with silanol groups to form siloxane bonds with extrusion of hydrogen gas. For transition-metal-catalyzed compositions comprising a hydridosilyl-containing compound, inhibitors are commonly used to ensure adequate shelf life or pot life.

Catalyst selection varies somewhat for these two classes of moisture-curable compositions, however, tin-based complexes, particularly DBTDL, efficiently catalyze moisture cure for both classes. Environmental regulatory agencies and directives, however, have increased or are expected to increase restrictions on the use of organotin compounds in formulated products. For example, while formulations with greater than 0.5 wt. % dibutyltin presently require labeling as toxic with reproductive 1B classification, dibutyltin-containing formulations are proposed to be completely phased out in consumer applications during the next one to two years.

The use of alternative organotin compounds such as dioctyltin compounds and dimethyltin compounds can only be considered as a short-term remedial plan, as these organotin compounds may also be regulated in the future. It would be beneficial to identify non-tin-based accelerators that accelerate the condensation curing of moisture-curable silicones and non-silicones.

Substitutes for organotin catalysts should exhibit properties similar to organotin compounds in terms of curing, storage, and appearance. Non-tin accelerators would also desirably initiate the condensation reaction of the selected polymers and complete this reaction upon the surface and may be in the bulk in a desired time schedule. There are therefore many proposals for the replacement of organometallic tin compounds with other metal- and non-metal-based compounds. These new accelerators have specific advantages and disadvantages in view of replacing tin compounds perfectly. Therefore, there is still a need to address the weaknesses of possible non-tin compounds as suitable accelerators for condensation cure reactions. The physical properties of uncured and cured compositions also warrant examination, in particular to maintain the ability to adhere onto the surface of several substrates.

SUMMARY

The present invention provides tin-free, curable compositions comprising polymers with reactive silyl groups and a condensation accelerator based on metal-arene complexes.

In one aspect, the invention provides a curable composition exhibiting a relatively short tack-free time, curing through the bulk, as well as long storage stability in the cartridge, i.e., in the absence of humidity. Metal-arene complexes, including compounds of formulas (6), (7), and/or (8), have been unexpectedly found to exhibit curing behavior similar to or even better than organotin compounds. Moreover, it has been found that such curing can be achieved upon exposure to moisture even in the absence of exposure to radiation. Therefore, such compounds can be suitable as replacements for organotin accelerators in compositions having polymers with reactive, silyl groups that can undergo condensation reactions, such as in RTV-1 and RTV-2 formulations.

Curable compositions using metal-arene complexes may also exhibit certain storage stability of the uncured composition in the cartridge, adhesion onto several surfaces, and a cure rate in a predictable time scheme.

In one aspect, the present invention provides a composition for forming a cured polymer composition comprising: (A) a polymer having at least one reactive silyl group; (B) a crosslinker or chain extender chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkoxyaminosiloxane, an alkoxycarbamatosilane, an alkoxycarbamatosiloxane, and combinations of two or more thereof; (C) a catalyst chosen from a metal-arene complex; (D) optionally at least one adhesion promoter chosen from a silane or siloxane other than the compounds listed under (B); (E), optionally, a filler component; and (F) optionally at least one acidic compound chosen from a phosphate ester, a phosphonate ester, a phosphonic acid, a phosphorous acid, a phosphite, a phosphonite ester, a sulfate, a sulfite, a pseudohalogenide, a branched $C_4$-$C_{25}$ alkyl carboxylic acid, or a combination of two or more thereof.

In one embodiment, the present invention provides a curable composition comprising a metal-arene complex that is substantially free of tin.

In one embodiment, the polymer (A) has the formula: $[R^1_a R^2_{3-a}Si-Z-]_n-X-Z-SiR^1_a R^2_{3-a}$. In another embodiment, X is chosen from a polyurethane; a polyester; a polyether; a polycarbonate; a polyolefin; a polyesterether; and a polyorganosiloxane having units of $R_3SiO_{1/2}$, $R_2SiO$, $RSiO_{3/2}$, and/or $SiO_2$, n is 0 to 100, a is 0 to 2, R, $R^1$, and $R^2$ can be identical or different at the same silicon atom and chosen from $C_1$-$C_{10}$ alkyl; $C_1$-$C_{10}$ alkyl substituted with one or more of Cl, F, N, O, or S; a phenyl; $C_7$-$C_{16}$ alkylaryl; $C_7$-$C_{16}$ arylalkyl; $C_2$-$C_{20}$-polyalkylene ether; or a combination of two or more thereof. In yet another aspect, $R^2$ is chosen from OH, $C_1$-$C_8$ alkoxy, $C_2$-$C_{18}$ alkoxyalkyl, alkoxyaryl, oximoalkyl, oximoaryl, enoxyalkyl, enoxyaryl, aminoalkyl, aminoaryl, carboxyalkyl, carboxyaryl, amidoalkyl, amidoaryl, carbamatoalkyl, carbamatoaryl, or a combination of two or more thereof, and Z is a bond, a divalent unit selected from the group of a $C_1$-$C_{14}$ alkylene, or O.

According to one embodiment, the crosslinker component (B) is chosen from tetraethylorthosilicate (TEOS); methyltrimethoxysilane (MTMS); vinyltrimethoxysilane; methylvinyldimethoxysilane; dimethyldimethoxysilane; dimethyldiethoxysilane; vinyltriethoxysilane; tetra-n-propylorthosilicate; tris(methylethylketoximo)vinylsilane; tris(methylethylketoximo)methylsilane; tris(acetamido) methylsilane; bis(acetamido)dimethylsilane; tris(N-methylacetamido)methylsilane; bis(N-methylacetamido)dimethylsilane; (N-methylacetamido)methyldialkoxysilane; tris (benzamido)methylsilane; tris(propenoxy)methylsilane; alkyldialkoxyamidosilanes; alkylalkoxybisamidosilanes; methylethoxybis(N-methylbenzamido)silane; methylethoxydibenzamidosilane; methyldimethoxy(ethylmethylketoximo)silane; bis(ethylmethylketoximo)methylmethoxysilane; (acetaldoximo)methyldimethoxysilane; (N-methylcarbamato)methyldimethoxysilane; (N-methylcarbamato) ethyldimethoxysilane; (isopropenoxy)methyldimethoxysilane; (isopropenoxy)trimethoxysilane; tris(isopropenoxy)methylsilane; (but-2-en-2-oxy) methyldimethoxysilane; (1-phenylethenoxy) methyldimethoxysilane; 2-((1-carboethoxy)propenoxy) methyldimethoxysilane; bis(N-methylamino)methylmethoxysilane; (N-methylamino)vinyldimethoxysilane; tetrakis(N,N-diethylamino)silane; methyldimethoxy(N-methylamino)silane; methyltris(cyclohexylamino)silane; methyldimethoxy(N-ethylamino)silane; dimethylbis(N,N-dimethylamino)silane; methyldimethoxy(N-isopropylamino)silane dimethylbis(N,N-diethylamino)silane; ethyldimethoxy(N-ethylpropionamido)silane; methyldimethoxy (N-methylacetamido)silane; methyltris(N-methylacetamido)silane; ethyldimethoxy(N-methylacetamido)silane; methyltris(N-methylbenzamido) silane; methylmethoxybis(N-methylacetamido)silane; methyldimethoxy(s-caprolactamo)silane; trimethoxy(N-methylacetamido)silane; methyldimethoxy(O-ethylacetimidato) silane; methyldimethoxy(O-propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxy(isocyanato)silane; dimethoxydiisocyanatosilane; methyldimethoxy-isothiocyanatosilane; methylmethoxydiisothiocyanatosilane; methyltriacetoxysilane; methylmethoxydiacetoxysilane; methylethoxydiacetoxysilane; methylisopropoxydiacetoxysilane; methyl(n-propoxy)diacetoxysilane; methyldimethoxyacetoxysilane; methyldiethoxyacetoxysilane; methyldiisopropoxyacetoxysilane; methyldi(n-propoxy)acetoxysilane; or the condensates thereof; or a combination of two or more thereof.

According to one embodiment, the adhesion promoter component (D) is chosen from an (aminoalkyl)trialkoxysilane, an (aminoalkyl)alkyldialkoxysilane, a bis(trialkoxysilylalkyl)amine, a tris(trialkoxysilylalkyl)amine, a tris(trialkoxysilylalkyl)cyanuarate, a tris(trialkoxysilylalkyl) isocyanurate, an (epoxyalkyl)trialkoxysilane, an (epoxyalkylether)trialkoxysilane, oligomers formed from the condensates of the same or a combination of two or more thereof.

According to one embodiment, the component (F) is chosen from a phosphate ester of the formula: $(R^3O)PO(OH)_2$; a phosphite ester of the formula $(R^3O)P(OH)_2$; or a phosphonic acid of the formula: $R^3P(O)(OH)_2$. In another aspect, $R^3$ is a $C_1$-$C_{18}$ alkyl, a $C_2$-$C_{20}$ alkoxyalkyl, phenyl, a $C_7$-$C_{12}$ alkylaryl, a $C_2$-$C_4$ polyalkylene oxide ester or its mixtures with diesters; a branched $C_4$-$C_{14}$ alkyl carboxylic acid; or a combination of two or more thereof.

According to one embodiment, the composition comprises about 1 to about 10 wt. % of the crosslinker component (B) based on 100 wt. % of the polymer component (A).

According to one embodiment, the crosslinker component (B) is chosen from a silane or a siloxane, the silane or siloxane having two or more reactive groups that can undergo hydrolysis and/or condensation reaction with polymer (A) or on its own in the presence of water and component (F).

According to one embodiment, the polymer component (A) is chosen from a polyorganosiloxane comprising divalent units of the formula $[R_2SiO]$ in the backbone, wherein R is chosen from $C_1$-$C_{10}$ alkyl; $C_1$-$C_{10}$ alkyl substituted with one or more of Cl, F, N, O, or S; phenyl; $C_7$-$C_{16}$ alkylaryl; $C_7$-$C_{16}$ arylalkyl; $C_2$-$C_{20}$ polyalkylene ether; or a combination of two or more thereof.

According to one embodiment, the condensation accelerator (C) is present in an amount of from about 0.001 to about 10 wt. pt. per 100 wt. pt. of component (A).

According to one embodiment, the component (F) is present in an amount of from about 0.02 to about 7 wt. pt. per 100 wt. pt. of component (A).

According to one embodiment, the polymer component (A) has the formula:

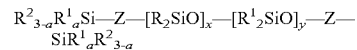

$$R^2_{3-a}R^1_a Si-Z-[R_2SiO]_x-[R^1_2SiO]_y-Z-SiR^1_a R^2_{3-a}$$

whereby x is 0 to 10000; y is 0 to 1000; a is 0 to 2; R is methyl. In another aspect, $R^1$ is chosen from a $C_1$-$C_{10}$ alkyl; a $C_1$-$C_{10}$ alkyl substituted with one or more of Cl, F, N, O, or S; a phenyl; a $C_7$-$C_{16}$ alkylaryl; a $C_7$-$C_{16}$ arylalkyl; a $C_2$-$C_{20}$ polyalkylene ether; or a combination of two or more thereof, and other siloxane units may be present in amounts less than 10 mol. % preferably methyl, vinyl, phenyl. In yet another embodiment, $R^2$ is chosen from OH, a $C_1$-$C_8$ alkoxy, a $C_2$-$C_{18}$ alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is —O—, a bond, or —$C_2H_4$—.

According to one embodiment, the composition further comprises a solvent chosen from an alkylbenzene, a trialkylphosphate, a triarylphosphate, a phthalic acid ester, an arylsulfonic acid ester having a viscosity-density constant (VDC) of at least 0.86 that is miscible with a polyorganosiloxane and accelerator component (B), a polyorganosiloxane devoid of reactive groups and having a viscosity of less than 2000 mPa·s at 25° C., or a combination of two or more thereof.

According to one embodiment, the composition is provided as a one-part composition.

According to one embodiment, the composition comprises 100 pt. wt. of component (A), 0.1 to about 10 pt. wt. of at least one crosslinker (B), 0.01 to about 7 pt. wt. of an accelerator (C), 0.1 to about 5 pt. wt. of an adhesion promoter (D), 0 to about 300 pt. wt. of component (E), 0.01 to about 8 pt. wt. of component (F) whereby this composition can be stored in the absence of humidity and is curable in the presence of humidity upon exposure to ambient air.

According to one embodiment, the composition is a two-part composition comprising: (i) a first portion comprising the polymer component (A), optionally the filler component (E), and optionally the acidic compound (F); and (ii) a second portion comprising the crosslinker (B), the accelerator component (C), the adhesion promoter (D), and the acidic compound (F), whereby (i) and (ii) are stored separately until applied for curing by mixing of the components (i) and (ii).

According to one embodiment, portion (i) comprises 100 wt. % of component (A), and 0 to 70 pt. wt. of component (E); and portion (ii) comprises 0.1 to 10 pt. wt. of at least one crosslinker (B), 0.01 to 7 pt. wt. of an accelerator (C), 0 to 5 pt. wt. of an adhesion promoter (D), and 0.02 to 3 pt. wt. component (F).

In another aspect, the present invention provides, a composition for forming a cured polymer composition comprising (A) a polymer having at least a reactive silyl group, where the polymer is free of siloxane bonds; (B) a crosslinker or chain extender chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alklarylaminosiloxane, an alkoxycarbamatosilane, an alkoxycarbamatosiloxane, the condensates thereof, and combinations of two or more thereof; and (C) a condensation accelerator comprising a metal-arene complex.

In another aspect, the present invention provides a composition for forming a cured polymer composition comprising (A) a compound having at least one hydridosilyl group, and (C) a condensation cure accelerator comprising a metal-arene complex.

DETAILED DESCRIPTION

The present invention provides a curable composition employing a metal-arene complex as a condensation accelerator. Metal-arene complexes have been found to exhibit similar or superior curing properties as compared to compositions employing organotin compounds, such as DBTDL, in terms of accelerating moisture-assisted condensation curing of silicones to result in crosslinked silicones that can be used as sealants and RTVs (Room-Temperature Vulcanized Rubber), silicone foams, or as silicone release coatings. Further, the metal-arene complexes also exhibit improved storage stability.

As used herein, "alkyl" includes straight, branched and cyclic alkyl groups. Specific and non-limiting examples of alkyls include, but are not limited to, methyl, ethyl, propyl, isobutyl, ethyl-hexyl, etc.

As used herein, "substituted alkyl" includes an alkyl group that contains one or more substituent groups that are inert under the process conditions to which the compound containing these groups is subjected. The substituent groups also do not substantially interfere with the process. As used herein, unsubstituted means the particular moiety carries hydrogen atoms on its constituent atoms, e.g. $CH_3$ for unsubstituted methyl. Substituted means that the group can carry typical functional groups known in organic chemistry.

As used herein, "aryl" includes a non-limiting group of any aromatic hydrocarbon from which one hydrogen atom has been removed. An aryl may have one or more aromatic rings, which may be fused, connected by single bonds or other groups. Specific and non-limiting examples of aryls include, but are not limited to, tolyl, xylyl, phenyl, naphthalenyl, etc.

As used herein, "substituted aryl" includes an aromatic group substituted as set forth in the above definition of "substituted alkyl." Similar to an aryl, a substituted aryl may have one or more aromatic rings, which may be fused, connected by single bonds or other groups; however, when the substituted aryl has a heteroaromatic ring, the free valence in the substituted aryl group can be a heteroatom (such as nitrogen) of the heteroaromatic ring instead of a carbon. In one embodiment, substituted aryl groups herein contain 1 to about 30 carbon atoms.

As used herein, "aralkyl" include an alkyl group substituted by aryl groups.

The term "cycloalkyl" refers to a saturated or partially saturated, monocyclic, fused polycyclic, or spiro polycyclic carbocycle.

As used herein, "hetero" compounds such as "heteroalkyl," "heteroaryl," etc. include compounds comprising a hetero atom such as O, N, P, S, etc.

The term "hydrocarbyloxy" as used herein refers to a radical. RO, a monovalent oxyhydrocarbon group such as alkoxy, cycloalkoxy, aryloxy, aralkoxy, alkenoxy, and similar oxyhydrocarbon groups derived from an alkyl, cycloalkyl, alkylaryl or arylalkyl alcohol, ketone, aldehyde or ester containing 1 to 20 carbon atoms. These alcohols, ketones, aldehydes or esters are referred to herein as oxygen containing compounds. Most typically the oxygen containing compound used in this invention is a monohydric alkanol, cycloalkanol or aromatic alcohol, ROH, in which R is a hydrocarbon radical having 1-18 carbon atoms.

In one embodiment, the present invention provides a curable composition comprising a polymer component (A) comprising a reactive silyl group; a crosslinker component (B); an accelerator component (C) comprising an a metal-arene complex; optionally an adhesion promoter component (D); an optional filler component (E); optionally an acidic compound (F), and optionally auxiliary components (G).

In another embodiment, the present invention provides a curable composition comprising a polymer component (A) comprising a hydridosilyl group; an accelerator component (C) comprising a metal-arene complex; and optionally auxiliary components (G).

The polymer component (A) may be a liquid- or solid-based polymer having a reactive silyl group. The polymer component (A) is not particularly limited and may be chosen from any crosslinkable polymer as may be desired for a particular purpose or intended use. Non-limiting examples of suitable polymers for the polymer component (A) include polyorganosiloxanes (A1) or organic polymers free of siloxane bonds (A2), wherein the polymers (A1) and (A2) comprise reactive silyl groups. In one embodiment, the polymer component (A) may be present in an amount of from about 10 to about 90 wt. % of the curable composition. In one embodiment, the curable composition comprises about 100 pt. wt. of the polymer component (A).

As described above, the polymer component (A) may include a wide range of polyorganosiloxanes. In one embodiment, the polymer component may comprise one or more polysiloxanes and copolymers of formula (1):

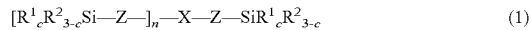  (1)

$R^1$ may be chosen from linear or branched alkyl, linear or branched heteroalkyl, cycloalkyl, heterocycloalkyl, aryl, heteroaryl, linear or branched aralkyl, linear or branched heteroaralkyl, or a combination of two or more thereof. In one embodiment, $R^1$ may be chosen from $C_1$-$C_{10}$ alkyl; $C_1$-$C_{10}$ alkyl substituted with one or more of Cl, F, N, O, or S; phenyl; $C_7$-$C_{16}$ alkylaryl; $C_7$-$C_{16}$ arylalkyl; $C_2$-$C_{20}$ polyalkylene ether; or a combination of two or more thereof. Exemplary preferred groups are methyl, trifluoropropyl, and/or phenyl groups.

$R^2$ may be a group reactive to protic agents such as water. Exemplary groups for $R^2$ include OH, alkoxy, alkenyloxy, alkyloximo, alkylcarboxy, arylcarboxy, alkylamido, arylamido, or a combination of two or more thereof. In one embodiment, $R^2$ is chosen from OH, $C_1$-$C_8$ alkoxy, $C_2$-$C_{18}$ alkoxyalkyl, amino, alkenyloxy, alkyloximo, alkylamino, arylamino, alkylcarboxy, arylcarboxy, alkylamido, arylamido, alkylcarbamato, arylcarbamato, or a combination of two or more thereof.

Z may be a bond, a divalent linking unit selected from the group of O, hydrocarbons which can contain one or more O, S, or N atom, amide, urethane, ether, ester, urea units or a combination of two or more thereof. If the linking group Z is a hydrocarbon group, then Z is linked to the silicon atom over a silicon-carbon bond. In one embodiment, Z is chosen from a $C_1$-$C_{14}$ alkylene.

X is chosen from a polyurethane; a polyester; a polyether; a polycarbonate; a polyolefin; a polyesterether; and a polyorganosiloxane having units of $R^1_3SiO_{1/2}$, $R^1_2SiO$, $R^1SiO_{3/2}$, and/or $SiO_2$, where $R^1$ is defined as above. X may be a divalent or multivalent polymer unit selected from the group of siloxy units linked over oxygen or hydrocarbon groups to the silyl group comprising the reactive group $R^2$ as described above, polyether, alkylene, isoalkylene, polyester, or polyurethane units linked over hydrocarbon groups to the silicon atom comprising one or more reactive groups $R^2$ as described above. The hydrocarbon group X can contain one or more heteroatoms such as N, S, O, or P forming amides, esters, ethers, urethanes, esters, and/or ureas. In one embodiment, the average polymerization degree ($P_n$) of X should be more than 6, e.g. polyorganosiloxane units of $R^1_3SiO_{1/2}$, $R^1_2SiO$, $R^1SiO_{3/2}$, and/or $SiO_2$. In formula (1), n is 0 to 100; desirably 1, and c is 0 to 2, desirably 0 to 1.

Non-limiting examples of the components for unit X include polyoxyalkylene polymers such as polyoxyethylene, polyoxypropylene, polyoxybutylene, polyoxyethylene-polyoxypropylene copolymer, polyoxytetramethylene, or polyoxypropylene-polyoxybutylene copolymer; ethylene-propylene copolymer, polyisobutylene, polychloroprene, polyisoprene, polybutadiene, copolymer of isobutylene and isoprene, copolymers of isoprene or butadiene and acrylonitrile and/or styrene, or hydrocarbon polymers such as hydrogenated polyolefin polymers produced by hydrogenating these polyolefin polymers; polyester polymer manufactured by a condensation of dibasic acid such as adipic acid or phthalic acid and glycol, or ring-opening polymerization of lactones; polyacrylic acid ester produced by radical polymerization of a monomer such as $C_2$-$C_8$-alkyl acrylates, vinyl polymers, e.g., acrylic acid ester copolymer of acrylic acid ester such as ethyl acrylate or butyl acrylate and vinyl acetate, acrylonitrile, methyl methacrylate, acrylamide, or styrene; graft polymer produced by polymerizing the above organic polymer with a vinyl monomer; polycarbonates; polysulfide polymer; polyamide polymer such as Nylon 6 produced by ring-opening polymerization of ε-caprolactam, Nylon 6-6 produced by polycondensation of hexamethylenediamine and adipic acid, etc., Nylon 12 produced by ring-opening polymerization of ε-laurolactam, copolymeric polyamides, polyurethanes, or polyureas.

Particularly suitable polymers include, but are not limited to, polysiloxanes, polyoxyalkylenes, saturated hydrocarbon polymers such as polyisobutylene, hydrogenated polybutadiene and hydrogenated polyisoprene, or polyethylene, polypropylene, polyesters, polycarbonates, polyurethanes, polyurea polymers and the like. Furthermore, saturated hydrocarbon polymer, polyoxyalkylene polymer, and vinyl copolymer are particularly suitable due to their low glass transition temperature which provide a high flexibility at low temperatures, i.e., below 0° C.

The reactive silyl groups in formula (1) can be introduced by employing silanes containing a functional group which has the ability to react by known methods with unsaturated hydrocarbons via hydrosilylation, or reaction of SiOH, aminoalkyl or -aryl, HOOC-alkyl or -aryl, HO-alkyl or -aryl, HS-alkyl or -aryl, Cl(O)C-alkyl or -aryl, epoxyalkyl or epoxycycloalkyl groups in the prepolymer to be linked to a reactive silyl group via condensation or ring-opening reactions. Examples of the main embodiments include the following: (i) siloxane prepolymers having a SiOH group that can undergo a condensation reaction with a silane (LG) $SiR^1_cR^2_{3-c}$ whereby a siloxy bond ≡Si—O—$SiR^1_cR^2_{3-c}$ is formed while the addition product of the leaving group (LG) and hydrogen is released (LG-H); (ii)silanes having an unsaturated group that is capable of reacting via hydrosilylation or radical reaction with a SiH group or radically activated groups of a silane such as SiH or an unsaturated group; and (iii)silanes including organic or inorganic prepolymers having OH, SH, amino, epoxy, —COCl, —COOH groups, which can react complementarily with epoxy, isocyanato, OH, SH, cyanato, carboxylic halogenides, reactive alkylhalogenides, lactones, lactams, or amines, that is to link the reactive prepolymer with the organofunctional silanes to yield a silyl functional polymer.

Silanes suitable for method (i) include alkoxysilanes, especially tetraalkoxysilanes, di- and trialkoxysilanes, di- and triacetoxysilanes, di- and triketoximosilanes, di- and trialkenyloxysilanes, di- and tricarbonamidosilanes, wherein the remaining residues at the silicon atom of the silane are substituted or unsubstituted hydrocarbons. Other non-limiting silanes for method (i) include alkyltrialkoxysilanes, such as vinyltrimethoxysilane, methyltrimethoxysilane, propyltrimethoxysilane, aminoalkyltrimethoxysilane, ethyltriacetoxysilane, methyl- or propyltriacetoxysilane, methyltributanonoximosilane, methyltripropenyloxysilane, methyltribenzamidosilane, or methyltriacetamidosilane. Prepolymers suitable for reaction under method (i) are SiOH-terminated polyalkylsiloxanes, which can undergo a condensation reaction with a silane having hydrolyzable groups attached to the silicon atom. Exemplary SiOH-terminated polyalkyldisiloxanes include polydimethylsiloxanes.

Suitable silanes for method (ii) include alkoxysilanes, especially trialkoxysilanes (HSi(OR)$_3$) such as trimethoxysilane, triethoxysilane, methyldiethoxysilane, methyldimethoxysilane, and phenyldimethoxysilane. Hydrogenchlorosilanes are in principle possible but are less desirable due to the additional replacement of the halogen through an alkoxy, acetoxy group, etc. Other suitable silanes include organofunctional silanes having unsaturated groups which can be activated by radicals, such as vinyl, allyl, mercaptoalkyl, or acrylic groups. Non-limiting examples include vinyltrimethoxysilane, mercaptopropyltrimethoxysilane, and methacryloxypropyltrimethoxysilane. Prepolymers suitable for reaction under method (ii) include vinyl-terminated polyalkylsiloxanes, preferably polydimethylsiloxanes, hydrocarbons with unsaturated groups which can undergo hydrosilylation or can undergo radically induced grafting reactions with a corresponding organofunctional group of a silane comprising, for example, unsaturated hydrocarbon or a SiH group.

Another method for introducing silyl groups into hydrocarbon polymers can be the copolymerization of unsaturated hydrocarbon monomers with the unsaturated groups of silanes. The introduction of unsaturated groups into a hydrocarbon prepolymer may include, for example, the use of alkenyl halogenides as chain stopper after polymerization of the silicon free hydrocarbon moiety.

Desirable reaction products between the silanes and prepolymers include the following structures: —SiR$^1_2$O—SiR$^1_2$—CH$_2$—CH$_2$—SiR$^1_c$R$^2_{3-c}$, or (hydrocarbon)-[Z—SiR$^1_c$R$^2_{3-c}$]$_n$. Suitable silanes for method (iii) include, but are not limited to, alkoxy silanes, especially silanes having organofunctional groups to be reactive to —OH, —SH, amino, epoxy, —COCl, or —COOH.

In one embodiment, these silanes have an isocyanatoalkyl group such as gamma-isocyanatopropyltrimethoxysilane, gamma-isocyanatopropylmethyldimethoxysilane, gamma-isocyanatopropyltriethoxysilane, gamma-glycidoxypropylethyldimethoxysilane, gamma-glycidoxypropyltrimethoxysilane, gamma-glycidoxypropyltriethoxysilane, beta-(3,4-epoxycyclohexyl)ethyltrimethoxysilane, beta-(3,4-epoxycyclohexyl)ethyltriethoxysilane, epoxylimonyltrimethoxysilane, N-(2-aminoethyl)-aminopropyltrimethoxysilane, gamma-aminopropyltriethoxysilane, gamma-aminopropyltrimethoxysilane, gamma-aminopropylmethyldimethoxysilane, gamma-aminopropylmethyldiethoxysilane, etc.

In one embodiment, it is desirable to select either blocked amines or isocyanates (Z'—X)$_n$—Z' for carrying out first a complete mixing and then the following coupling reaction. Examples of blocking agents are disclosed in EP 0947531 and other blocking procedures that employ heterocyclic nitrogen compounds such as caprolactam or butanone oxime, or cyclic ketones referred to in U.S. Pat. No. 6,827,875 both of which are incorporated herein by reference in their entirety.

Examples of suitable prepolymers for a reaction under method (iii) include, but are not limited to, polyalkylene oxides having OH groups, preferably with a high molecular weight (M$_w$, weight-average molecular weight >6000 g/mol) and a polydispersity M$_w$/M$_n$ of less than 1.6; urethanes having remaining NCO groups, such as NCO functionalized polyalkylene oxides, especially blocked isocyanates. Prepolymers selected from the group of hydrocarbons having —OH, —COOH, amino, epoxy groups, which can react complementarily with an epoxy, isocyanato, amino, carboxyhalogenide or halogenalkyl group of the corresponding silane having further reactive groups useful for the final cure.

Suitable isocyanates for the introduction of a NCO group into a polyether may include toluene diisocyanate, diphenylmethane diisocyanate, or xylene diisocyanate, or aliphatic polyisocyanate such as isophorone diisocyanate, or hexamethylene diisocyanate.

The polymerization degree of the unit X depends on the requirements of viscosity and mechanical properties of the cured product. If X is a polydimethylsiloxane unit, the average polymerization degree based on the number average molecular weight M$_n$ is preferably 7 to 5000 siloxy units, preferably 200 to 2000 units. In order to achieve a sufficient tensile strength of >5 MPa, an average polymerization degree P$_n$ of >250 is suitable whereby the polydimethylsiloxanes have a viscosity of more than 300 mPa·s at 25° C. If X is a hydrocarbon unit other than a polysiloxane unit, the viscosity with respect to the polymerization degree is much higher.

Examples of the method for synthesizing a polyoxyalkylene polymer include, but are not limited to, a polymerization method using an alkali catalyst such as KOH, a polymerization method using a metal-porphyrin complex catalyst such as a complex obtained by reacting an organoaluminum compound, a polymerization method using a composite metal cyanide complex catalyst disclosed, e.g., in U.S. Pat. Nos. 3,427,256; 3,427,334; 3,278,457; 3,278,458; 3,278,459; 3,427,335; 6,696,383; and 6,919,293.

If the group X is selected from hydrocarbon polymers, then polymers or copolymers having isobutylene units are particularly desirable due to its physical properties such as excellent weatherability, excellent heat resistance, and low gas and moisture permeability.

Examples of the monomers include olefins having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, alpha-methylstyrene, dimethylstyrene, beta-pinene, indene, and for example, but not limited to, vinyltrialkoxysilanes, e.g. vinyltrimethoxysilane, vinylmethyldichlorosilane, vinyldimethylmethoxysilane, divinyldichlorosilane, divinyldimethoxysilane, allyltrichlorosilane, allylmethyldichlorosilane, allyldimethylmethoxysilane, diallyldichlorosilane, diallyldimethoxysilane, gamma-methacryloyloxypropyltrimethoxysilane, and gamma-methacryloyloxypropylmethyldimethoxysilane.

Examples of suitable siloxane-free organic polymers include, but are not limited to, silylated polyurethane (SPUR), silylated polyester, silylated polyether, silylated polycarbonate, silylated polyolefins like polyethylene, polypropylene, silylated polyesterether and combinations of two or more thereof. The siloxane-free organic polymer may be present in an amount of from about 10 to about 90 wt. % of the composition or about 100 pt. wt.

In one embodiment, the polymer component (A) may be silylated polyurethane (SPUR). Such moisture curable compounds are known in the art in general and can be obtained by various methods including (i) reacting an isocyanate-terminated polyurethane (PUR) prepolymer with a suitable silane, e.g., one possessing both hydrolyzable functionality at the silicon atom, such as, alkoxy, etc., and secondly active hydrogen-containing functionality such as mercaptan, primary or secondary amine, preferably the latter, etc., or by (ii) reacting a hydroxyl-terminated PUR (polyurethane) prepolymer with a suitable isocyanate-terminated silane, e.g., one possessing one to three alkoxy groups. The details of these reactions and those for preparing the isocyanate-terminated and hydroxyl-terminated PUR prepolymers employed therein can be found in, amongst others: U.S. Pat. Nos. 4,985,491; 5,919,888; 6,207,794; 6,303,731; 6,359, 101; and 6,515,164, and published U.S. Patent Publication Nos. 2004/0122253 and US 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722; 3,632,557; 3,971,751; 5,623,044; 5,852,137; 6,197,912; and 6,310,170 (moisture-curable SPUR (silane modified/terminated polyurethane) obtained from reaction of isocyanate-terminated PUR prepolymer and reactive silane, e.g., aminoalkoxysilane); and, U.S. Pat. Nos. 4,345,053; 4,625,012; 6,833,423; and published U.S. Patent Publication 2002/0198352 (moisture-curable SPUR obtained from reaction of hydroxyl-terminated PUR prepolymer and isocyanatosilane). The entire contents of the foregoing U.S. patent documents are incorporated by reference herein. Other examples of moisture-curable SPUR materials include those described in U.S. Pat. No. 7,569,653, the disclosure of which is incorporated by reference in its entirety.

In one embodiment, the polymer component (A) may be a polymer of formula (2):

$$R^2_{3-c}R^1_cSi—Z—[R_2SiO]_x[R^1_2SiO]_y—Z—SiR^1_cR^2_{3-c} \quad (2)$$

where $R^1$, $R^2$, Z, and c are defined as above with respect to formula (1); R is $C_1$-$C_6$ alkyl (an exemplary alkyl being methyl); x is 0 to about 10,000, in one embodiment from 11 to about 2500; and y is 0 to about 10,000; preferably 0 to 500. In one embodiment, Z in a compound of formula (2) is a bond or a divalent $C_1$-$C_{14}$ alkylene group, especially preferred is —$C_2H_4$—.

In one embodiment, the polymer component (A) may be a polyorganosiloxane of the formula (3):

$$R^2_{3-c-d}SiR^3_cR^4_d—[OSiR^3R^4]_x—[OSiR^3R^4]_y—OSiR^3_eR^4_fR^2_{3-e-f} \quad (3)$$

where $R^2$, c, x, and y are defined as above with respect to formula (1); where $R^3$ and $R^4$ can be identical or different on the same silicon atom and are chosen from hydrogen; $C_1$-$C_{10}$ alkyl; $C_1$-$C_{10}$ heteroalkyl, $C_3$-$C_{12}$ cycloalkyl; $C_2$-$C_{30}$ heterocycloalkyl; $C_6$-$C_{13}$ aryl; $C_7$-$C_{30}$ alkylaryl; $C_7$-$C_{30}$ arylalkyl; $C_4$-$C_{12}$ heteroaryl; $C_5$-$C_{30}$ heteroarylalkyl; $C_5$-$C_{30}$ heteroalkylaryl; $C_2$-$C_{100}$ polyalkylene ether; or a combination of two or more thereof. Where d is 0, 1, or 2; e is 0, 1, or 2; and f is 0, 1, or 2.

The polymer component (A) may also comprise a combination of two or more polymers. In one embodiment, the polymer component (A) comprises a combination of two or more polymers defined above.

Non-limiting examples of suitable polysiloxane-containing polymers (A1) include, for example, silanol-stopped polydimethylsiloxane, silanol or alkoxy-stopped polyorganosiloxanes, e.g., methoxystopped polydimethylsiloxane, alkoxy-stopped polydimethylsiloxane-polydiphenylsiloxane copolymer, and silanol or alkoxy-stopped fluoroalkyl-substituted siloxanes such as poly(methyl 3,3,3-trifluoropropyl) siloxane and poly(methyl 3,3,3-trifluoropropyl)siloxane-polydimethyl siloxane copolymer. The polyorganosiloxane component (A1) may be present in an amount of about 10 to about 90 wt. % of the composition or 100 pt. wt. In one preferred embodiment, the polyorganosiloxane component has an average chain length in the range of about 10 to about 2500 siloxy units, and the viscosity is in the range of about 10 to about 500,000 mPa·s at 25° C.

Alternatively, the composition may include silyl-terminated organic polymers (A2) that are free of siloxane units, and which undergo curing by a condensation reaction comparable to that of siloxane containing polymers (A1). Similar to the polyorganosiloxane polymer (A1), the organic polymers (A2) that are suitable as the polymer component (A) include a reactive silyl group. In one embodiment, the reactive silyl group may be of the formula (4):

$$—SiR^1_dR^2_{3-d} \quad (4)$$

where $R^1$, $R^2$, and d are as defined above.

The polysiloxane composition may further include a crosslinker or a chain extender as component (B). In one embodiment, the crosslinker is of the formula (5):

$$R^1_dSiR^2_{4-d} \quad (5)$$

wherein $R^1$, $R^2$, and d are as defined above. Alternatively, the crosslinker component may be a condensation product of formula (5) wherein one or more but not all $R^2$ groups are hydrolyzed and released in the presence of water and then intermediate silanols undergo a condensation reaction to give a Si—O—Si bond and water. The average polymerization degree can result in a compound having 2 to 10 Si units.

In one embodiment, the crosslinker is an alkoxysilane having a formula $R^3_d(R^1O)_{4-d}Si$, wherein $R^1$, $R^3$, and d are defined as above. In another embodiment, the crosslinker is an acetoxysilane having a formula $(R^3_d(R^1CO_2)_{4-d}Si$, wherein $R^1$, $R^3$, and d are defined as above. In still another embodiment, the crosslinker is an oximosilane having a formula $R^3_d(R^1R^4C=N—O)_{4-d}Si$, where $R^1$, $R^3$, $R^4$, and d are defined as above.

As used herein, the term crosslinker includes a compound including an additional reactive component having at least two hydrolysable groups and less than three silicon atoms per molecule not defined under (A). In one embodiment, the crosslinker or chain extender may be chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkylarylaminosiloxane, an alkoxycarbamatosilane, an alkoxycarbamatosiloxane, an imidatosilane, a ureidosilane, an isocyanatosilane, a isothiocyanatosilane, the condensates thereof and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoximo) silane; vinyltris(methylethylketoximo)silane; 3,3,3-trifluoropropyltris(methylethylketoximo)silane; methyltris (isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis(ethylmethylketoximo)silane; methyldimethoxy(acetaldoxime)silane; methyldimethoxy(N-methylcarbamato)silane; ethyldimethoxy(N-methylcarbamato)silane; methyldimethoxyisopropenoxysilane; trimethoxyisopropenoxysilane; methyltriisopropenoxysilane; methyldimethoxy(but-2-en-2-oxy)silane; methyldimethoxy(1-phenylethenoxy)silane; methyldimethoxy-2-(1-carboethoxypropenoxy)silane; methylmethoxydi(N-methylamino)silane; vinyldimethoxy(methylamino)silane; tetra-N,N-diethylaminosilane;

methyldimethoxy(methylamino)silane; methyltri(cyclohexylamino)silane; methyldimethoxy(ethylamino)silane; dimethyldi(N,N-dimethylamino)silane; methyldimethoxy(isopropylamino)silane; dimethyldi(N,N-diethylamino)silane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxy(ethylacetimidato)silane; methyldimethoxy(propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxyisothiocyanatosilane; methylmethoxydiisothiocyanatosilane, the condensates thereof, or combinations of two or more thereof. In one embodiment, the crosslinker may be present in an amount from about 1 to about 10 wt. % of the composition or from about 0.05 to about 10 pt. wt. per 100 pt. wt. of the polymer component (A). In another embodiment, the crosslinker may be present in an amount from about 0.05 to about 5 pt. wt. per 100 pt. wt. of the polymer component (A). In still another embodiment, the crosslinker may be present in an amount from about 0.5 to about 3 pt. wt. per 100 pt. wt. of the polymer component (A). Here as elsewhere in the specification and claims, numerical values may be combined to form new or undisclosed ranges.

Additional alkoxysilanes in an amount greater than 0.1 wt. % of component (A) that are not consumed by the reaction between the prepolymer Z'—X—Z' and which comprise additional functional groups selected from $R^5$ can also work as an adhesion promoter and are defined and counted under component (D).

In one embodiment, the condensation accelerator (C) comprises an metal-arene complex as a catalyst and/or cure accelerator. As described below, the metal-arene complex can be chosen from compounds of various formulas. It will be appreciated that the composition can comprise one or more metal-arene complexes and can include mixtures of two or more metal-arene complexes of the same category as further described herein, or a mixture of two or more metal-arene complexes, where the metal-arene complexes are chosen from different categories of compounds.

In one embodiment, the metal-arene complex is chosen from a compound of the Formula (6):

$$[(R^9)_k(R^{10})_l M'^{(m)}][R^{11}]_p \quad (6)$$

wherein M' is a metal atom chosen from Cr, V, Mn, Fe, Ru, Os, Co, or Ni;

$R^9$ may be the same or different, substituted or unsubstituted, and is independently chosen from indenyl, tetrahydroindenyl, fluorenyl, octahydrofluorenyl, tetrahydrofluorenyl, or cyclopentadienyl, the $R^9$ group having a hapticity of either 3 or 5, and where a substituted $R^9$ group is substituted with from one to five substituents independently chosen from an alkyl, an alkenyl, an alkynyl, an aryl, an aralkyl, an amino, a heteroalkyl, a carboxy acid, a carboxy ester, an aminocarbonyl, a sulfinyl, a sulfonyl, a phosphino, a silyl, a germyl, a halo, a cyano, a hydrocarbyloxy, and combinations of two or more thereof;

$R^{10}$ may be the same or different and is independently selected from benzene and R-substituted benzene, where the benzene ring has a hapticity of either 2, 4, or 6, and the substituted benzene group being substituted with from one to six substituents independently chosen from an alkyl, an aryl, an aralkyl, an amino, an alkoxy, an aryloxy, an alkylthio, an arylthio, a silyl, a germyl, a halo, a cyano, a hydrocarbyloxy, and combinations of two or more thereof;

$R^{11}$ is either a coordinated ligand, a counterion, or both, and is independently selected from a hydride, an alkyl, a cycloalkyl, a $\eta^1$-cyclopentadienyl, a $\eta^3$-cyclopentadienyl, a $\eta^5$-cyclopentadienyl, a carbonyl, an acetylacetonate, an acetoacetate, a cyanide, an amide, a carboxamide, a sulfonamide, a bis(sulfonyl)amide, an azide, a nitrosyl, an oxo, a hydroxy, an alkoxide, a siloxide, an aryloxide, a carboxylate, a sulfonate, a halide, a sulfide, a mercaptan, a sulfoxide, a phosphonite, a phosphate, a phosphite, a nitrate, a sulfate, a sulfite, an arylborate, a fluoroborate, a fluorophosphate, a fluoroantimonate, a chlorate, a bromate, an iodate, an alkoxyaluminum, a hydroxoaluminate, or a cyanometallate, and may be the same or different;

k+p=m, k=0 to 2, l=0 to 2, p=0 or 1, and m is the oxidation state of the metal atom M'.

Combinations of two $R^9$ groups, an $R^9$ and an $R^{10}$ group, an $R^9$ and an $R^{11}$ group, two $R^{10}$ groups, an $R^{10}$ and an $R^{11}$ group, or two $R^{11}$ groups can be connected by at least one carbon- or silicon-based bridge such that they form a multidentate ligand. Further, this bridge may comprise heteroatoms including but not limited to O, N, S, and P. It is appreciated that these complexes may exist as dimers, trimers, tetramers, or other higher order oligomeric species. It is further appreciated that these complexes may also contain water of hydration or solvent molecules not bound to the metal center.

Examples of suitable metal-arene complexes of the formula (6) include, but are not limited to, bis(cyclopentadienyl)vanadium(II), bis(cyclopentadienyl)chromium(II), bis(isopropylcyclopentadienyl)chromium(II), bis(phenylcyclopentadienyl)chromium(II), bis(pentamethylcyclopentadienyl)chromium(II), bis(tetramethylcyclopentadienyl)chromium(II), bis(benzene)chromium, bis(ethylbenzene)chromium, bis(cyclopentadienyl)manganese (II), bis(isopropylcyclopentadienyl)manganese(II), bis(phenylcyclopentadienyl)manganese(II), bis(pentamethylcyclopentadientyl)manganese(II), bis(tetramethylcyclopentadienyl)manganese(II), bis(cyclopentadienyl)iron(II), bis(pentamethylcyclopentadienyl)iron(II), bis(phenylcyclopentadienyl)iron(II), bis(isopropylcyclopentadienyl)iron(II), bis(tetramethylcyclopentadienyl)iron(II), bis(cyclopentadienyl)ruthenium(II), bis(phenylcyclopentadienyl)ruthenium(II), bis(tetramethylcyclopentadienyl)ruthenium (II), bis(isopropylcyclopentadienyl)ruthenium(II), bis(pentamethylcyclopentadienyl)ruthenium(II), bis(cyclopentadienyl)osmium(II), bis(pentamethylcyclopentadienyl)osmium(II), bis(tetramethylcyclopentadienyl)osmium (II), bis(isopropylcyclopentadienyl)osmium(II), bis(phenylcyclopentadienyl)osmium(II), bis(cyclopentadienyl)cobalt(II), bis(phenylcyclopentadienyl)cobalt(II), bis(tetramethylcyclopentadienyl)cobalt(II), bis(pentamethylcyclopentadienyl)cobalt(II), bis(isopropylcyclopentadienyl)cobalt(II), bis(cyclopentadienyl)nickel(II), bis(ethylcyclopentadienyl)nickel(II), bis(isopropylcyclopentadienyl)nickel(II), bis(tetramethylcyclopentadienyl)nickel(II), bis(pentamethylcyclopentadienyl)nickel(II), bis(cyclopentadienyl)chromium(III) hexafluorophosphate, bis (pentamethylcyclopentadienyl)chromium(III) hexafluorophosphate, bis(isopropylcyclopentadienyl)chromium(III) hexafluorophosphate, bis(phenylcyclopentadienyl)chromium(III) hexafluorophosphate, bis(tetramethylcyclopentadienyl)chromium(III) hexafluorophosphate, bis(cyclopentadienyl)chromium(III) tetrafluoroborate, bis(pentamethylcyclopentadienyl)chromium(III) tetrafluoroborate, bis(isopropylcyclopentadienyl)chromium(III) tetrafluoroborate, bis(phenylcyclopentadienyl)chromium(III) tetrafluoroborate, bis(tetramethylcyclopentadienyl)chromium(III) tetrafluoroborate, bis(cyclopentadienyl)iron(III) hexafluorophosphate, bis(pentamethylcyclopentadienyl)iron(III) hexafluorophosphate, bis(isopropylcyclopentadienyl)iron(III) hexafluorophosphate, bis(phenylcyclopentadienyl)iron(III) hexafluorophosphate, bis(tetramethylcyclopentadienyl)iron(III) hexafluorophosphate, bis(cyclopentadienyl)iron(III) tetrafluoroborate, bis(pentamethylcyclopentadienyl)iron(III) tetrafluoroborate, bis(isopropylcyclopentadienyl)iron(III) tetrafluoroborate, bis(phenylcyclopentadienyl)iron(III) tetrafluoroborate, bis(tetramethylcyclopentadienyl)iron(III) tetrafluoroborate, bis(cyclopentadienyl)ruthenium(III) hexafluorophosphate, and (p-cymene)cyclopentadienylruthenium(II) hexafluorophosphate.

In another embodiment, the metal-arene complexes are chosen from compound of the formula (7):

$(R^9)_q(R^{10})_rM''^{(m)}(R^{11})_s(L)_t$ (7)

wherein M'' is a metal atom chosen from Ti, Zr, Hf, V, Nb, Ta, Cr, Mo, W, Mn, Fe, Ru, or Co;

$R^9$, $R^{10}$, $R^{11}$, and m can be as described above;

L is a neutral ligand;

q+s=m, q=0 or 1, r=0 or 1, s=1 to 4, and t is from 0 to 5; with the proviso that both q and r cannot be 1.

In complexes of the formula (7), combinations of an $R^9$ and an $R^{11}$ group, an $R^9$ and an L group, an $R^{10}$ and an $R^{11}$ group, an $R^{10}$ and an L group, two $R^{11}$ groups, an $R^{11}$ group and an L group, or two L groups can be connected by at least one carbon- or silicon-based bridge such that they form a multidentate ligand. Further, this bridge may comprise heteroatoms including but not limited to O, N, S, and P.

It is appreciated that the complexes of the formula (7) may exist as dimers, trimers, tetramers, or other higher order oligomeric species. It is further appreciated that these complexes may also contain water of hydration or solvent molecules not bound to the metal center.

Examples of suitable metal-arene complexes of the formula (7) include but are not limited to (cyclopentadienyl)titanium trichloride, trimethoxy(pentamethylcyclopentadienyl)titanium, trimethyl(pentamethylcyclopentadienyl)titanium, (cyclopentadienyl)zirconium trichloride, (pentamethylcyclopentadienyl)zirconium trichloride, trisdimethylamido(cyclopentadienyl)hafnium, (cyclopentadienyl)vanadium tetracarbonyl, (cyclopentadienyl)niobium tetrachloride, (cyclopentadienyl)tantalum tetrachloride, (benzene)chromium tricarbonyl, (pentamethylcyclopentadienyl)chromium dicarbonyl dimer, (cyclopentadienyl)molybdenum tricarbonyl dimer, (cyclopentadienyl)molybdenum tetrachloride, (pentamethylcyclopentadienyl)molybdenum dicarbonyl dimer, mesitylene tungsten tricarbonyl, (cyclopentadienyl)manganese tricarbonyl, (cyclopentadienyl)rhenium tricarbonyl, (isopropylcyclopentadienyl)rhenium tricarbonyl, (cyclopentadienyl)cobalt dicarbonyl, (cyclopentadienyl)iron dicarbonyl dimer, (p-cymene)ruthenium dichloride dimer.

In still another embodiment, the metal-arene complex is chosen from a compound of the formula (8):

$(R^9)_2M'''^{(m)}(R^{11})_u(L)_v$ (8)

wherein M''' is a metal atom chosen from Sc, Y, Lu, Ti, Zr, Hf, V, Nb, Ta, Mo, W, La, Ce, Sm, or Yb;

$R^9$, $R^{11}$, L, and m can be as described above; and u+2=m; v=0 to 10; and u=0 to 4.

In complexes of the formula (8), combinations of two $R^9$ groups, two $R^{11}$ groups, an $R^{11}$ and an L group, or two L groups can be connected by at least one carbon- or silicon-based bridge such that they form a multidentate ligand. Further, this bridge may comprise heteroatoms including but not limited to O, N, S, and P. It is appreciated that these complexes may exist as dimers, trimers, tetramers, or other higher order oligomeric species. It is further appreciated that these complexes may also contain water of hydration or solvent molecules not bound to the metal center.

Examples of suitable metal-arene complexes of the formula (8) include but are not limited to bis(cyclopentadienyl)titanium dichloride, bis(pentamethylcyclopentadienyl)titanium dichloride, bis(tetramethylcyclopentadienyl)titanium dichloride, bis(phenylcyclopentadienyl)titanium dichloride, bis(isopropylcyclopentadienyl)titanium dichloride, bis((trimethylsilyl)cyclopentadienyl)titanium dichloride, bis(indenyl)titanium dichloride, bis(isopropylindenyl)titanium dichloride, bis(tetrahydroindenyl)titanium dichloride, bis(cyclopentadienyl)titanium dibromide, (cyclopentadienyl)(pentamethylcyclopentadienyl)titanium dichloride, bis(fluorenyl)titanium dichloride, dimethylsilanediyl-bis(cyclopentadienyl)titanium dichloride, [1,2-ethanediylbis(1-indenyl)]titanium dichloride, tris(cyclopentadienyl)titanium, bis(cyclopentadienyl)zirconium dichloride, bis(pentamethylcyclopentadienyl)zirconium dichloride, bis(tetramethylcyclopentadienyl)zirconium dichloride, bis(phenylcyclopentadienyl)zirconium dichloride, bis(isopropylcyclopentadienyl)zirconium dichloride, bis(indenyl)zirconium dichloride, bis(isopropylindenyl)zirconium dichloride, bis(cyclopentadienyl)hafnium dichloride, bis(pentamethylcyclopentadienyl)hafnium dichloride, bis(tetramethylcyclopentadienyl)hafnium dichloride, bis(phenylcyclopentadienyl)hafnium dichloride, bis(isopropylcyclopentadienyl)hafnium dichloride, bis(indenyl)hafnium dichloride, bis(isopropylindenyl)hafnium dichloride, bis(cyclopentadienyl)vanadium dichloride, bis(pentamethylcyclopentadienyl)vanadium dichloride, bis(tetramethylcyclopentadienyl)vanadium dichloride, bis(phenylcyclopentadienyl)vanadium dichloride, bis(isopropylcyclopentadienyl)vanadium dichloride, bis(cyclopentadienyl)niobium dichloride, bis(cyclopentadienyl)tantalum dichloride, bis(cyclopentadienyl)molybdenum dichloride, bis(indenyl)molybdenum dichloride, bis(cyclopentadienyl)tungsten dichloride, tris(cyclopentadienyl)scandium, tris(cyclopentadienyl)yttrium, tris(methylcyclopentadienyl)yttrium, tris(cyclopentadienyl)lutetium, tris(cyclopentadienyl)lanthanum, tris(isopropylcyclopentadienyl)lanthanum, tris(cyclopentadienyl)samarium, and tris(cyclopentadienyl)ytterbium, tris(cyclopentadienyl)cerium.

The alkyl group for $R^1$ or the substituents of the $R^9$ and $R^{10}$ groups can be a $(C_1-C_{20})$alkyl, a $(C_1-C_{12})$alkyl, $(C_1-C_8)$alkyl, $(C_1-C_6)$alkyl, even a $(C_1-C_4)$alkyl. Examples of suitable alkyl groups include, but are not limited to, methyl, ethyl, n-propyl, isopropyl, butyl, isobutyl, sec-butyl, tert-butyl, pentyl, isopentyl, tert-pentyl, hexyl, isohexyl, etc.

The cycloalkyl group for the $R^{11}$ or the substituents of the $R^9$ and $R^{10}$ groups can be a cycloalkyl having from 3 to 12 ring atoms per carbocycle, and can be optionally substituted or unsubstituted. In some embodiments, an alkyl group refers to a cycloalkyl group that accordingly includes a ring structure. Examples of suitable cycloalkyl groups include, but are not limited to, cyclopropyl, cyclobutyl, cyclopentyl, cyclohexyl, cycloheptyl, cyclooctyl, etc.

The aryl group suitable for the substituents of the $R^9$ and $R^{10}$ groups can have from 6 to 30 carbon atoms, for example, about 6-14 carbon atoms, about 6-13 carbon atoms, or about 6-10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted. In one embodiment, the aryl can be phenyl, indenyl, 5,6,7,8-tetrahydronaphthyl, naphthyl, etc.

The silyl group suitable for the substituents for the $R^9$ and $R^{10}$ groups can be of the formula:

wherein $R^{12}$ is the same or different and is chosen from the group consisting of hydrogen, an alkoxy group, a dialkylamino group, a diarylamino group, an arylalkylamino group, a linear or branched alkyl, a cycloalkyl, a linear or branched heteroalkyl, an aryl, a linear or branched aralkyl, an alkyl or aralkyl bridge formed by two $R^{12}$ groups, or a combination of two or more thereof.

The germyl group suitable for the substituents for the $R^9$ and $R^{10}$ groups can be of the formula:

wherein $R^{12}$ is defined as above.

The condensation accelerator (C) can comprise a single metal-arene complex compound or a combination of two or more metal-arene complexes. The condensation accelerator (C) can function as a reaction accelerator. It can also be considered and may function as a catalyst.

In one embodiment, the accelerator (C) is substantially free of tin. In one embodiment, the accelerator has less than 10 wt. % of tin; less than 7.5 wt. % of tin; less than 5 wt. % of tin; less than 1 wt. % of tin; less than 0.1 wt. % of tin; even less than 0.01 wt. % of tin.

The accelerator (C) can include other compounds known to accelerate or catalyze the condensation reaction such as complexes or salts of metals including, but not limited to, strontium, barium, yttrium, titanium, zirconium, hafnium, chromium, molybdenum, manganese, iron, ruthenium, cobalt, nickel, zinc, lanthanum, cerium, samarium, aluminum, indium, lead, bismuth; carboxylic acids including but not limited to acetic acid, lauric acid, stearic acid, and Versatic acid; alkyl- and arylsulfonic acids including, but not limited to, p-toluenesulfonic acid and methanesulfonic acid; inorganic acids including, but not limited to, hydrochloric acid, phosphoric acid, and boric acid; amines including, but not limited to, trioctylamine, dibutylamine, and dodecylamine; guanidines including but not limited to tetramethylguanidine; amidines including, but not limited to, 1,8-diazabicyclo[5.4.0]-7-undecene (DBU) and 1,5-diazabicyclo[4.3.0]non-5-ene (DBN); and inorganic bases including, but not limited to, lithium hydroxide and sodium methoxide; such that the system is substantially free of fluorine and tin.

In one embodiment, the condensation accelerator (C) may be added to the curable composition such that the metal-arene complex is present or added in an amount of from about 0.001 to about 10 pt. wt. related to 100 part per weight of component (A). In another embodiment the metal-arene complex may be present in an amount of from about 0.01 to about 7.0 pt. wt. In still another embodiment, the metal-arene complex may be present in an amount of from about 0.1 to about 2.5 pt. wt. In still another embodiment, the metal-arene complex may be present in an amount of about 0.005 to about 7 pt. wt.; about 0.05 to about 5 pt. wt.; from about 0.1 to 4 pt. wt.; from about 0.5 to about 2 pt. wt.; from about 1 to about 1.5 pt. wt. per 100 parts per weight of the polymer (A); even from about 0.2 to about 0.5 pt. wt. per 100 pt. wt. of component (A). In another embodiment, the metal-arene complex is present in an amount of from about 0.005 to about 0.05 pt. wt. per 100 pt. wt. of component (A). An increase in the amount of metal-arene complex as an accelerator may increase the cure rate of curing the surface and decrease the cure time for a tack-free surface and the complete cure through the bulk.

The composition further includes an adhesion promoter component (D) that is different from component (A) or (B). In one embodiment, the adhesion promoter (D) may be an organofunctional silane comprising the group $R^5$, e.g., aminosilanes, and other silanes that are not identical to the silanes of component (B), or are present in an amount that exceeds the amount of silanes necessary for endcapping the polymer (A). The amount of non-reacted silane (B) or (D) in the reaction for making (A) can be defined in that after the endcapping reaction the free silanes are evaporated at a higher temperature up to 200° C. and vacuum up to 1 mbar to be more than 0.1 wt. % of (A).

In one embodiment, the composition comprises an adhesion promoter (D) comprising a group $R^5$ as described by the general formula (9):

$$R^5_g R^1_d Si(R^2)_{4-d-g} \qquad (9)$$

where $R^5$ is E-$(CR^3_2)_h$—W—$(CH_2)_h$—; $R^1$, $R^2$, and d are as described above; g is 1 or 2; d+g=1 to 2; and h is 0 to 8, and may be identical or different.

Non-limiting examples of suitable compounds include:

  (9a) or (9b)

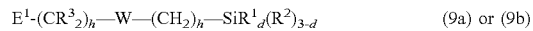  (9c) or (9d)

where j is 2 to 3.

The group E may be selected from either a group $E^1$ or $E^2$. $E^1$ may be selected from a monovalent group comprising amine, —$NH_2$, —NHR, —$(NHC_2H_5)_a$NHR, $NHC_6H_5$, halogen, pseudohalogen, unsaturated aliphatic group with up to 14 carbon atoms, epoxy-group-containing aliphatic group with up to 14 carbon atoms, cyanurate-containing group, and an isocyanurate-containing group.

$E^2$ may be selected from a group comprising a di- or multivalent group consisting of amine, polyamine, cyanurate-containing, and an isocyanurate-containing group, sulfide, sulfate, phosphate, phosphite, and a polyorganosiloxane group, which can contain $R^5$ and $R^2$ groups; W is selected from the group consisting of a single bond, a heteroatomic group selected from —COO—, —O—, epoxy, —S—, —CONH—, —HN—CO—NH— units; $R^3$ is as defined above, $R^1$ may be identical or different as defined above, $R^2$ is defined as above and may be identical or different.

Non-limiting examples of component (D) include:

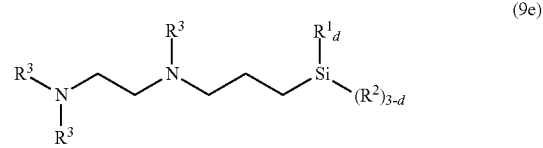  (9e)

-continued

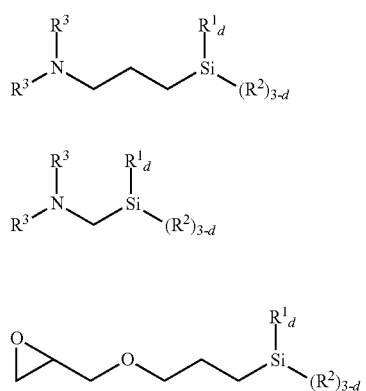
(9f)

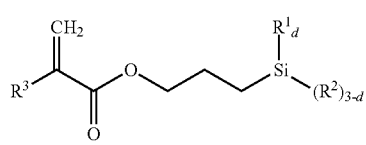
(9h)

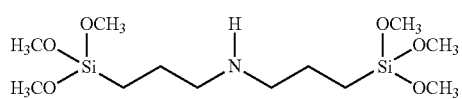
(9i)

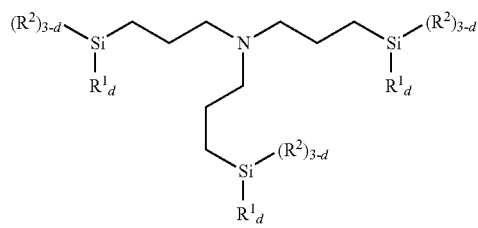
(9j)

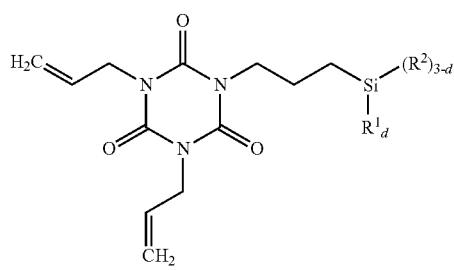
(9k)

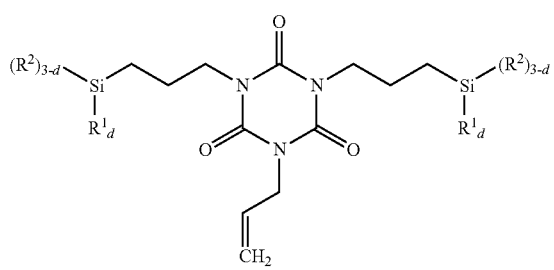
(9l)

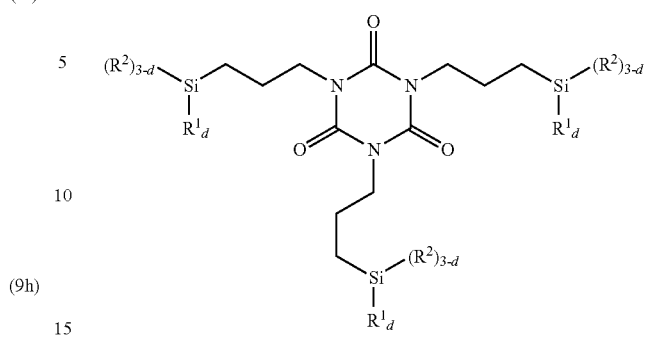
(9n)

wherein $R^1$, $R^2$, and d are as defined above. Examples of component (D) include compounds of the formulas (9a-9n). Furthermore the formula (9c) of compounds (D) shall comprise compounds of the formula (9p):

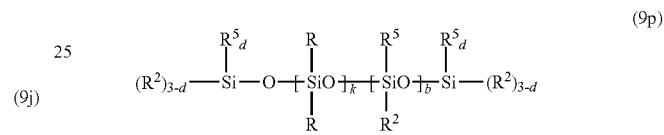
(9p)

wherein R, $R^2$, $R^5$, and d are as defined above; k is 0 to 6 (and in one embodiment desirably 0); b is as described above (in one embodiment desirably 0 to 5); and 1+b≤10. In one embodiment, $R^5$ is selected from:

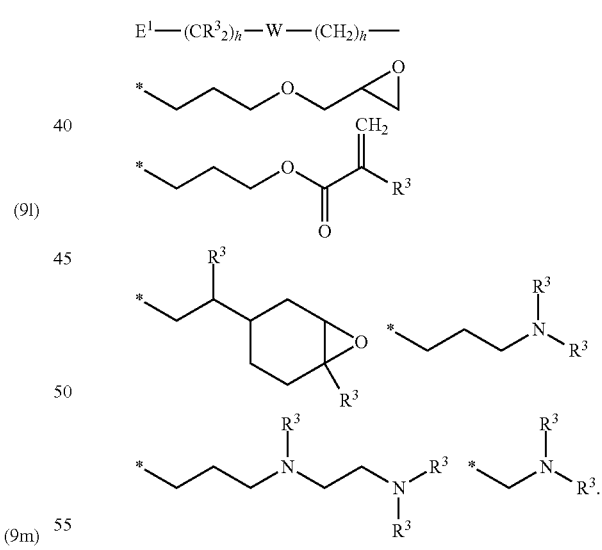

An exemplary group of adhesion promoters are selected from the group that consists of amino-group-containing silane coupling agents. The amino-group-containing silane adhesion promoter agent (D) is a compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolyzable groups.

Examples of other suitable adhesion promoter (D) include, but are not limited to N-(2-aminoethyl)aminopropyltrimethoxysilane, gamma-aminopropyltriethoxysilane, gamma-aminopropyltrimethoxysilane, bis(3-trimethoxysilypropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, gamma-glycidoxypropylmethyldimethoxysilane, gamma-glycidoxypropylmethyldiethoxysilane, beta-(3,4-epoxycyclohexyl)ethyltrimethoxysilane, beta-(3,4-epoxycyclohexyl)ethylmethyldimethoxysilane, beta-(3,4-epoxycyclohexyl)ethyltriethoxysilane, beta-(3,4-epoxycyclohexyl)ethylmethyldiethoxysilane, epoxylimonyltrimethoxysilane, isocyanatopropyltriethoxysilane, isocyanatopropyltrimethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, alpha, omega-bis(aminoalkyldiethoxysilyl)polydimethylsiloxanes (Pn=1-7), alpha, omega-bis(aminoalkyldiethoxysilyl) octamethyltetrasiloxane, 4-amino-3,3-dimethylbutyltrimethoxysilane, and N-ethyl-3-trimethoxysilyl-2-methylpropanamine, 3-(N,N-diethylaminopropyl) trimethoxysilane combinations of two or more thereof, and the like. Particularly suitable adhesion promoters include bis(alkyltrialkoxysilyl)amines and tris (alkyltrialkoxysilyl)amines including, but not limited to, bis(3-trimethoxysilylpropyl)amine and tris(3-trimethoxysilylpropyl)amine.

Also it is possible to use derivatives obtained by modifying them, for example, amino-modified silyl polymer, silylated amino polymer, unsaturated aminosilane complex, phenylamino long-chain alkyl silane and aminosilylated silicone. These amino-group-containing silane coupling agents may be used alone, or two or more kinds of them may be used in combination.

The adhesion promoter (D) may be present in an amount of from about 0.05 to about 5.0 pt. wt. based on 100 parts of the polymer component (A). In one embodiment, the adhesion promoter may be present in an amount of from about 0.15 to about 2.0 pt. wt. based on 100 parts of the polymer component (A). In another embodiment, the adhesion promoter may be present in an amount of from about 0.5 to about 1.5 pt. wt of the polymer component (A). This defines the amount of (D) in composition of (A) wherein the content of free silanes coming from the endcapping of polymer (A) is smaller than 0.1 wt. %.

The present compositions may further include a filler component (E). The filler component(s) (E) may have different functions, such as to be used as reinforcing or semi-reinforcing filler, i.e., to achieve higher tensile strength after curing. The filler component may also have the ability to increase viscosity, establish pseudoplasticity/shear thinning, and demonstrate thixotropic behavior. Non-reinforcing fillers may act as volume extenders. The reinforcing fillers are characterized by having a specific surface area of more than 50 $m^2/g$ related BET-surface, whereby the semi-reinforcing fillers have a specific surface area in the range of 10-50 $m^2/g$. So-called extending fillers have preferably a specific surface area of less than 10 $m^2/g$ according to the BET-method and an average particle diameter below 100 µm. In one embodiment, the semi-reinforcing filler is a calcium carbonate filler, a silica filler, or a mixture thereof.

Examples of suitable reinforcing fillers include, but are not limited to, fumed silicas or precipitated silicas, which can be partially or completely treated with organosilanes or siloxanes to make them less hydrophilic and decrease the water content or control the viscosity and storage stability of the composition. These fillers are named hydrophobic fillers. Tradenames are Aerosil®, HDK®, Cab-O-Sil® etc.

Examples of suitable extending fillers include, but are not limited to, ground silicas (Celite™), precipitated and colloidal calcium carbonates (which are optionally treated with compounds such as stearate or stearic acid); reinforcing silicas such as fumed silicas, precipitated silicas, silica gels and hydrophobized silicas and silica gels; crushed and ground quartz, cristobalite, alumina, aluminum hydroxide, titanium dioxide, zinc oxide, diatomaceous earth, iron oxide, carbon black, powdered thermoplastics such as acrylonitrile, polyethylene, polypropylene, polytetrafluoroethylene and graphite or clays such as kaolin, bentonite or montmorillonite (treated/untreated), and the like.

The type and amount of filler added depends upon the desired physical properties for the cured silicone/non-silicone composition. As such, the filler may be a single species or a mixture of two or more species. The extending fillers can be present from about 0 to about 300 wt. % of the composition related to 100 parts of component (A). The reinforcing fillers can be present from about 5 to about 60 wt. % of the composition related to 100 parts of component (A), preferably 5 to 30 wt. %.

The inventive compositions optionally comprise an acidic compound (F), which, in conjunction with the adhesion promoter and metal-arene complex(es), accelerator, may accelerate curing (as compared to curing in the absence of such compounds). The component (F) may be present in an amount of from about 0.001 to about 5 wt. % of the composition. In another embodiment 0.01 to about 8 parts per weight (pt. wt.) per 100 pt. wt. of component (A) are used, more preferably 0.02 to 3 pt. wt. per 100 pt. wt. of component (A) and most preferably 0.02 to 1 pt. wt. per 100 pt. wt. of component (A) are used.

The acidic compounds (F) may be chosen from various phosphate esters, phosphonates, phosphites, phosphonites, sulfites, sulfates, pseudohalogenides, branched alkyl carboxylic acids, combinations of two or more thereof, and the like. Without being bound to any particular theory, the acidic compounds (F) may, in one embodiment, be useful as stabilizers in order to ensure a longer storage time when sealed in a cartridge before use in contact with ambient air. Especially alkoxy-terminated polysiloxanes can lose the ability to cure after storage in a cartridge and show decreased hardness under curing conditions. It may, therefore be useful to add compounds of the formula (10), which can extend storage time or ability to cure over months,

$$O=P(OR^6)_{3-e}(OH)_e \qquad (10)$$

whereby c is as defined above; and $R^6$ is selected from the group of linear or branched and optionally substituted $C_1$-$C_{30}$ alkyl groups, linear or branched $C_5$-$C_{14}$ cycloalkyl groups, $C_6$-$C_{14}$ aryl groups, $C_6$-$C_{31}$ alkylaryl groups, linear or branched $C_2$-$C_{30}$ alkenyl groups or linear or branched $C_1$-$C_{30}$ alkoxyalkyl groups, $C_4$-$C_{300}$ polyalkenylene oxide groups (polyethers), such as Marlophor® N5 acid, triorganylsilyl- and diorganyl ($C_1$-$C_8$)-alkoxysilyl groups. The phosphates can include also mixtures of primary and secondary esters. Non-limiting examples of suitable phosphonates include 1-hydroxyethane-(1,1-diphosphonic acid) (HEDP), aminotris(methylene phosphonic acid) (ATMP), diethylenetriaminepenta(methylene phosphonic acid) (DTPMP), 1,2-diaminoethane-tetra(methylene phosphonic acid) (EDTMP), and phosphonobutanetricarboxylic acid (PBTC).

In another embodiment, a compound of the formula $O=P(OR^7)_{3-g}(OH)_g$ may be present or added where g is 1 or 2, and $R^7$ is defined as $R^6$ or di- or mulitvalent hydrocarbons with one or more amino group.

Another type are phosphonic acid compounds of the formula $R^6P(O)(OH)_2$ such as alkyl phosphonic acids preferably hexyl or octyl phosphonic acid.

In one embodiment, the acidic compound may be chosen from a mono ester of phosphoric acid of the formula $(R^8O)PO(OH)_2$; a phosphonic acid of the formula $R^8P(O)(OH)_2$; or a monoester of phosphorous acid of the formula $(R^8O)P(OH)_2$ where $R^8$ is a $C_1$-$C_{18}$ alkyl, a $C_2$-$C_{20}$ alkoxyalkyl, phenyl, a $C_7$-$C_{12}$ alkylaryl, a $C_2$-$C_4$ polyalkylene oxide ester or its mixtures with diesters, etc.

In another embodiment, the acidic compound is a branched $C_4$-$C_{30}$ alkyl carboxylic acids, including $C_5$-$C_{19}$ acids with an alpha tertiary carbon, or a combination of two or more thereof. Examples of such suitable compounds include, but are not limited to, Versatic™ Acid, lauric acid, and stearic acid. In one embodiment, the acidic compound may be a mixture comprising branched alkyl carboxylic acids. In one embodiment, the acidic compound is a mixture of mainly tertiary aliphatic $C_{10}$ carboxylic acids.

Generally, the acidic component (F) is added in a molar ratio of less than or equal to 1 with respect to accelerator (C). In embodiments, the acidic component (F) is added in a molar ratio of (F):(C) of 1:15 to 1:1.

The curable composition may also include auxiliary substances (G) such as plasticizers, pigments, stabilizers, antimicrobial agents, fungicides, biocides, and/or solvents. Preferred plasticizers for reactive polyorganosiloxanes (A) are selected from the group of polyorganosiloxanes having chain lengths of 10 to 300 siloxy units. Preferred are trimethylsilyl terminated polydimethylsiloxanes having a viscosity of 100 to 1000 mPa·s at 25° C. The choice of optional solvents (dispersion media or extenders) may have a role in assuring uniform dispersion of the accelerator, thereby altering curing speed. Such solvents include polar and non-polar solvents such as toluene, hexane, chloroform, methanol, ethanol, isopropyl alcohol, acetone, methylethyl ketone, dimethylformamide (DMF), dimethyl sulfoxide (DMSO), N-methylpyrrolidinone (NMP), and propylene carbonate. Water can be an additional component (G) to accelerate fast curing 2-part compositions RTV-2, whereby the water can be in one part of the 2 compositions. Particularly suitable non-polar solvents include, but are not limited to, toluene, hexane, and the like if the solvents should evaporate after cure and application. In another embodiment, the solvents include high-boiling hydrocarbons such as alkylbenzenes, phthalic acid esters, arylsulfonic acid esters, trialkyl- or triarylphosphate esters, which have a low vapor pressure and can extend the volume providing lower costs. Examples cited by reference may be those of U.S. Pat. Nos. 6,599,633; 4,312,801. The solvent can be present in an amount of from about 20 to about 99 wt. % of the accelerator composition.

Applicants have found that the metal-arene based accelerator may provide a curable composition that yields a cured polymer exhibiting a tack-free time, hardness, and/or cure time comparable to compositions made using tin catalysts.

In one embodiment, a composition in accordance with the present invention comprises: 100 pt. wt. polymer component (A); about 0.1 to about 10 pt. wt. crosslinker component (B); and about 0.01 to about 7 pt. wt. accelerator (C). In one embodiment, the composition further comprises from about 0.1 to about 5, in one embodiment 0.15 to 1 pt. wt., of an adhesion promoter component (D); about 0 to about 300 pt. wt. filler component (E); about 0.01 to about 7 pt. wt. of acidic compound (F); optionally 0 to about 15 pt. wt. component (G), where the pt. wt. of components (B)-(G) are each based on 100 parts of the polymer component (A). In one embodiment, the composition comprises the component (F) in an amount of from about 0.01 to about 1 pt. wt. per 100 pt. wt. of component (A). In still another embodiment, the composition comprises the accelerator (C) in an amount of from about 0.1 to about 0.8 wt. pt. per 100 wt. pt of component (A).

It will be appreciated that the curable compositions may be provided as either a one-part composition or a two-part composition. A one-part composition refers to a composition comprising a mixture of the various components described above. A two-part composition may comprise a first portion and a second portion that are separately stored and subsequently mixed together just prior to application for curing. In one embodiment, a two-part composition comprises a first portion (P1) comprising a polymer component (A) and a crosslinker component (B), and a second portion (P2) comprising the accelerator component (C) comprising the metal-arene complex. The first and second portions may include other components (F) and/or (G) as may be desired for a particular purpose or intended use. For example, in one embodiment, the first portion (P1) may optionally comprise an adhesion promoter (D) and/or a filler (E), and the second portion (P2) may optionally comprise auxiliary substances (G), a cure rate modifying component (F), and water (G).

In one embodiment, a two-part composition comprises (i) a first portion comprising the polymer component (A), optionally the filler component (E), and optionally the acidic compound (F); and (ii) a second portion comprising the crosslinker (B), the accelerator component (C), the adhesive promoter (D), and the acidic compound (F), where portions (i) and (ii) are stored separately until applied for curing by mixing of the components (i) and (ii).

An exemplary two-part composition comprises: a first portion (i) comprising 100 pt. wt. of component (A), and 0 to 70 pt. wt. of component (E); and a second portion (ii) comprising 0.1 to 5 pt. wt. of at least one crosslinker (B); 0.01 to 4 pt. wt. of an accelerator (C); 0.1 to 2 pt. wt. of an adhesion promoter (D); and 0.02 to 1 pt. wt. component (F).

The curable compositions may be used in a wide range of applications including as materials for sealing, mold making, glazing, prototyping; as adhesives; as coatings in sanitary rooms; as joint seal between different materials, e.g., sealants between ceramic or mineral surfaces and thermoplastics; as paper release; as impregnation materials; and the like. A curable composition in accordance with the present invention comprising metal-arene compound as an accelerator may be suitable for a wide variety of applications such as, for example, a silicone release coating for substrates including paper and plastic, a weatherstrip coating, a general purpose and industrial sealant, potting compound, caulk, adhesive or coating for construction use, insulated glass, structural glazing, where glass sheets are fixed and sealed in metal frame; caulks, adhesives for metal plates, car bodies, vehicles, electronic devices, and the like. Furthermore, the present composition may be used either as a one-part or as a two-part formulation that can adhere onto broad variety of metal, mineral, ceramic, rubber, or plastic surfaces.

Curable compositions comprising metal-arene complex may be further understood with reference to the following Examples.

EXAMPLES

The following examples demonstrate the use of the metal-arene complexes as catalysts in moisture curable compositions. The Examples are for the purpose of illustrating aspects and embodiments of the present invention and not intended to limit the invention to the specific embodiments.

Heat Ageing Method

A premixed mixture (Component B) containing ethyl polysilicate, adhesion promoter, and catalyst are kept in an oven for (1) 4 hours at 50° C., or (2) 5 days at 70° C. After the specified period, the mixture is removed from the oven and allowed to return to ambient temperature. This mixture is then combined with Component A and mixed on a Hauschild mixer for 1.5 min. The mixed formulation was poured into a Teflon mold (L×W×D=10 cm×10 cm×1 cm) and placed inside a fume hood. These heat-ageing procedures represent or simulate the storage effect at room temperature over longer time periods.

Tack-Free Time (TFT) Measurement Method A

In a typical TFT measurement, the premixed composition of component A and Component B is poured into a Teflon mold (L×W×D=10 cm×10 cm×1 cm) and spread evenly using a stainless steel spatula. A 10-gram, stainless steel weight is placed on the surface of the formulation to determine the tackiness of the surface. TFT is defined as the time taken for getting a non-tacky surface. This time is recorded to the nearest minute.

Tack-Free Time Measurement Method B

Tack-free time identified as "Method B" is determined according to WPSTM E-63.

Snap Time Measurement Method

Snap time (work life) is determined according to WPSTM E-31a.

Shore A Hardness Measurement Method A

Shore A hardness values are determined after three (3) days of cure time. This measurement method is used as a measure of time required for bulk cure of the sample. Bulk cure time is the time required for complete curing of formulation throughout the thickness (i.e. top to bottom).

Shore A Hardness Measurement Method B

Shore A hardness values identified as "Method B" are determined according to WPSTM E-3.

Physical Properties of Sheet Specimens

Tensile strength, % elongation, and modulus are determined according to WPSTM E-1.

Substrate Adhesion Test Method A

Cohesive failure to glass, metal, and plastic substrates identified as "Method A" is determined in the following manner. The premixed composition of Component A and Component B is applied as thick lines on the pre-cleaned and dried standard plastic, glass and metal substrates. The substrates are kept at room temperature for three days. After three days, the adhered and cured materials are removed from substrates to check the cohesive or adhesive failure.

Substrate Adhesion Testing Method B

Cohesive failure of the cured sample to glass or anodized aluminum substrates, identified as "Method B," is determined in accordance with ASTM C1135.

Example 1

To a mixture of 1 gram of ethyl polysilicate, 1.4 grams of aminosilane-based adhesion promoters, and 0.05 grams of bis(cyclopentadienyl)iron(II), 100 grams of a 70:30 silanol polymer:filler blend was added and mixed using a Hauschild mixer for 1.5 minutes. The mixed formulation was poured into a Teflon mold.

Example 2

To a mixture of 1 gram of ethyl polysilicate, 1.4 grams of aminosilane-based adhesion promoters, and 0.1 grams of bis(cyclopentadienyl)iron(II), 100 grams of a 70:30 silanol polymer:filler blend was added and mixed using a Hauschild mixer for 1.5 minutes. The mixed formulation was poured into a Teflon mold.

Example 3

To a mixture of 1 gram of ethyl polysilicate, 2.0 grams of aminosilane-based adhesion promoters, and 0.1 grams of bis(cyclopentadienyl)iron(II), 100 grams of a 70:30 silanol polymer:filler blend was added and mixed using a Hauschild mixer for 1.5 minutes. The mixed formulation was poured into a Teflon mold.

Comparative Example 1

To a mixture of 1 gram of ethyl polysilicate, 1.4 grams of aminosilane-based adhesion promoters, and 0.08 grams of dibutyltin dilaurate was added 100 grams of a 70:30 silanol polymer:filler blend. This composition was mixed using a Hauschild mixer for 1.5 minutes. The mixed formulation was poured into a Teflon mold.

Properties of the composition of Examples 1-3 and Comparative Example 1 are illustrated in Table 1.

TABLE 1

| Property | | Ex 1 | Ex 2 | Ex 3 | CE 1 |
| --- | --- | --- | --- | --- | --- |
| B Component Aged 4 hours at 50° C. | | | | | |
| Tack Free Time, minutes | Method A | 27 | 28 | 26 | 25 |
| Shore A Hardness (Top) | Method A | 33 | 31 | 31 | 32 |
| Shore A Hardness (Bottom) | Method A | 25 | 25 | 15 | 23 |
| Adhesion to Substrate A[a] | Method A | − | − | + | NT |
| Adhesion to Substrate B | Method A | − | − | + | NT |
| B Component Aged 5 days at 70° C. | | | | | |
| Tack Free Time, minutes | Method A | 45 | 60 | 37 | 30 |
| Shore A Hardness (Top) | Method A | 28 | 29 | 31 | 29 |
| Shore A Hardness (Bottom) | Method A | 23 | 25 | 17 | 23 |
| Adhesion to Substrate A | Method A | + | + | + | NT |
| Adhesion to Substrate B | Method A | + | + | + | NT |

[a]Adhesion results: (−) denotes 100% adhesive failure; (+) denotes 100% cohesive failure.

Example 4 (107-1)

To a glass vial was added 0.36 grams of titanocene dichloride followed by 6.51 grams of ethyl polysilicate. To this heterogeneous mixture was added 7.52 grams of gamma-aminopropyltrimethoxysilane. The mixture was mixed on a vortex mixer for approximately 2 minutes in 15-second intervals. The mixture (Component B) was allowed to stand for 16 to 24 hours prior to use.

A plastic mixing cup was charged with 26.70 grams of 50-50 polymer/filler blend and 0.79 grams of Component B. The formulation was then mixed in a Hauschild mixer. The resulting RTV formulation was tested for tack-free time according to Method B.

A second plastic mixing cup was charged with 117.20 grams of 50-50 polymer/filler blend and 3.47 grams of Component B. The formulation was then mixed in a Hauschild mixer. The resulting RTV formulation was tested in the cured state as shown in Table 2.

Example 5

To a glass vial was added 0.09 grams of titanocene dichloride followed by 6.51 grams of ethyl polysilicate. To this heterogeneous mixture was added 7.51 grams of gamma-aminopropyltrimethoxysilane. The mixture was mixed on a vortex mixer for approximately 2 minutes in 15-second intervals. The mixture (Component B) was allowed to stand for 16 to 24 hours prior to use.

A plastic mixing cup was charged with 25.60 grams of 50-50 polymer/filler blend and 0.75 grams of Component B. The formulation was then mixed in a Hauschild mixer. The resulting RTV formulation was tested for tack-free time according to Method B.

A second plastic mixing cup was charged with 116.60 grams of 50-50 polymer/filler blend and 3.42 grams of Component B. The formulation was then mixed in a Hauschild mixer. The resulting RTV formulation was tested in the cured state as shown in Table 2.

Comparative Example 2

To a glass vial was added 0.71 grams of Tyzor PITA (bis(ethyl acetoacetate)titanium diisopropoxide) followed by 6.5 grams of ethyl polysilicate. To this homogeneous mixture was added 7.5 grams of gamma-aminopropyltrimethoxysilane. The mixture was mixed on a vortex mixer for approximately 2 minutes in 15-second intervals. The mixture (Component B) was allowed to stand for 16 to 24 hours prior to use.

A plastic mixing cup was charged with 24.60 grams of 50-50 polymer/filler blend and 0.75 grams of Component B. The formulation was then mixed in a Hauschild mixer. The resulting RTV formulation was tested for tack-free time according to Method B.

A second plastic mixing cup was charged with 113.71 grams of 50-50 polymer/filler blend and 3.48 grams of Component B. The formulation was then mixed in a Hauschild mixer. The resulting RTV formulation was tested in the cured state as shown in Table 2.

TABLE 2

| Property | Test | Ex 4 | Ex 5 | CE 2 |
|---|---|---|---|---|
| Tack-Free Time, minutes | WPSTM E-63 | 8 | 16 | 23 |
| 7 Day RT Sheet Physicals | | | | |
| Durometer, Shore A | WPSTM E-3 | 22.9 | 25.3 | 26.2 |
| Tensile Strength, psi | WPSTM E-1 | 220 | 228 | 216 |
| Elongation, % | WPSTM E-1 | 220 | 233 | 215 |
| H-Specimen Physicals (7-Day Cure) | | | | |
| Cohesive Failure, % | ASTM C1135 | | | |
| Glass (%) | | 100 | 100 | 88 |
| Anodized Aluminum (%) | | 100 | 100 | 90 |
| Tensile Strength, psi | ASTM C1135 | 91 | 96 | 79 |
| Elongation, % | ASTM C1135 | 110 | 113 | 134 |
| H-Specimen Physicals (21-Day Cure) | | | | |
| Cohesive Failure, % | ASTM C1135 | | | |
| Glass (%) | | 100 | 100 | 88 |
| Anodized Aluminum (%) | | 100 | 100 | 90 |
| Tensile Strength, psi | ASTM C1135 | 104 | 99 | 92 |
| Elongation, % | ASTM C1135 | 112 | 115 | 122 |

Example 6

A stock solution of (pentamethylcyclopentadienyl)titanium trimethoxide in ethyl polysilicate was made using 1.30 grams of (pentamethylcyclopentadienyl)titanium trimethoxide and 24.0 grams of ethyl polysilicate. 6.87 grams of this stock solution was placed in a vial followed by 7.50 grams of gamma-aminopropyltrimethoxysilane. The mixture was mixed on a vortex mixer for approximately 15 seconds. The mixture (Component B) was allowed to stand for 16 to 24 hours prior to use.

A plastic mixing cup was charged with 26.93 grams of 50-50 polymer/filler blend and 0.80 grams of Component B. The formulation was then mixed in a Hauschild mixer. The resulting RTV formulation was tested for snap time according to WPSTM E-31a.

A second plastic mixing cup was charged with 197.22 grams of 50-50 polymer/filler blend and 5.86 grams of Component B. The formulation was then mixed in a Hauschild mixer. The resulting RTV formulation was tested in the cured state as shown in Table 3.

Example 7

To a glass vial was added 0.35 grams of zirconocene dichloride followed by 6.50 grams of ethyl polysilicate. To this heterogeneous mixture was added 7.50 grams of gamma-aminopropyltrimethoxysilane. The mixture was mixed on a vortex mixer for approximately 2 minutes in 15-second intervals. The mixture (Component B) was allowed to stand for 16 to 24 hours prior to use.

A plastic mixing cup was charged with 25.67 grams of 50-50 polymer/filler blend and 0.76 grams of Component B. The formulation was then mixed in a Hauschild mixer. The resulting RTV formulation was tested for snap time according to WPSTM E-31a.

A second plastic mixing cup was charged with 186.00 grams of 50-50 polymer/filler blend and 5.52 grams of Component B. The formulation was then mixed in a Hauschild mixer. The resulting RTV formulation was tested in the cured state as shown in Table 3.

Example 8

To a glass vial was added 0.35 grams of bis(pentamethylcyclopentadienyl)titanium dichloride followed by 6.52 grams of ethyl polysilicate. To this heterogeneous mixture was added 7.50 grams of gamma-aminopropyltrimethoxysilane. The mixture was mixed on a vortex mixer for approximately 2 minutes in 15-second intervals. The mixture (Component B) was stirred under ambient conditions overnight prior to use.

A plastic mixing cup was charged with 27.17 grams of 50-50 polymer/filler blend and 0.80 grams of Component B. The formulation was then mixed in a Hauschild mixer. The resulting RTV formulation was tested for snap time according to WPSTM E-31a.

A second plastic mixing cup was charged with 186.17 grams of 50-50 polymer/filler blend and 5.47 grams of Component B. The formulation was then mixed in a Hauschild mixer. The resulting RTV formulation was tested in the cured state as shown in Table 3.

Example 9

To a glass vial was added 0.35 grams of bis(cyclopentadienyl)zirconium ditrifluoromethanesulfonate, tetrahydrofuran adduct followed by 6.51 grams of ethyl polysilicate. To this heterogeneous mixture was added 7.51 grams of gamma-aminopropyltrimethoxysilane. The mixture was mixed on a vortex mixer for approximately 2 minutes in 15-second intervals. The mixture (Component B) was allowed to stand for 16 to 24 hours prior to use.

A plastic mixing cup was charged with 25.86 grams of 50-50 polymer/filler blend and 0.77 grams of Component B. The formulation was then mixed in a Hauschild mixer. The resulting RTV formulation was tested for snap time according to WPSTM E-31a.

A second plastic mixing cup was charged with 188.41 grams of 50-50 polymer/filler blend and 5.62 grams of Component B. The formulation was then mixed in a Hauschild mixer. The resulting RTV formulation was tested in the cured state as

TABLE 3

| Property | Test | Ex 6 | Ex 7 | Ex 8 | Ex 9 |
|---|---|---|---|---|---|
| Snap Time, minutes | WPSTM E-31a | 10 | 8 | 11 | 20 |
| 7 Day RT Sheet Physicals | | | | | |
| Durometer, Shore A | WPSTM E-3 | 28.8 | 24.5 | 28.9 | 30.8 |
| Tensile Strength, psi | WPSTM E-1 | 196 | 207 | 201 | 236 |
| Elongation, % | WPSTM E-1 | 167 | 202 | 168 | 164 |
| H-Specimen Physicals (7-Day Cure) | | | | | |
| Cohesive Failure, % | ASTM C1135 | | | | |
| Glass (%) | | 100 | 100 | 100 | 100 |
| Anodized Aluminum (%) | | 100 | 100 | 100 | 100 |
| Tensile Strength, psi | ASTM C1135 | 86 | 83 | 82 | 95 |
| Elongation, % | ASTM C1135 | 97 | 119 | 95 | 107 |
| H-Specimen Physicals (21-Day Cure) | | | | | |
| Cohesive Failure, % | ASTM C1135 | | | | |
| Glass (%) | | 100 | 100 | 100 | 100 |
| Anodized Aluminum (%) | | 100 | 100 | 100 | 100 |
| Tensile Strength, psi | ASTM C1135 | 96 | 93 | 111 | 108 |
| Elongation, % | ASTM C1135 | 104 | 140 | 104 | 101 |

Embodiments of the invention have been described above and modifications and alterations may occur to others upon the reading and understanding of this specification. The claims as follows are intended to include all modifications and alterations insofar as they come within the scope of the claims or the equivalent thereof.

What is claimed is:

1. A composition for forming a curable polymer composition comprising:
   (A) a polymer having at least a reactive silyl group;
   (B) a crosslinker or chain extender; and
   (C) a condensation accelerator comprising a metal-arene complex, wherein the metal-arene complex is chosen from a compound of the formula:

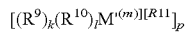

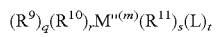

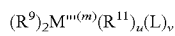

or a combination of two or more thereof, wherein:
   M' is a metal atom chosen from Cr, V, Mn, Fe, Ru, Os, Co, or Ni;
   M" is a metal atom chosen from Ti, Zr, Hf, V, Nb, Ta, Cr, Mo, Mn, Fe, Ru, or Co;
   M''' is a metal atom chosen from Sc, Y, Lu, Ti, Zr, Hf, V, Nb, Cr, Mo, W, Mn, La, Ce, Sm, or Yb;
   $R^9$ may be the same or different, substituted or unsubstituted, and is independently chosen from indenyl, tetrahydroindenyl, fluorenyl, octahydrofluorenyl, tetrahydrofluorenyl, or cyclopentadienyl, the $R^9$ group having a hapticity of either 3 or 5, and where a substituted $R^9$ group is substituted with from one to five substituents independently chosen from an alkyl, an alkenyl, an alkynyl, an aryl, an aralkyl, an amino, a heteroalkyl, a carboxy acid, a carboxy ester, an aminocarbonyl, an amino, a sulfinyl, a sulfonyl, a phosphino, a silyl, a germyl, a halo, a cyano, a hydrocarbyloxy, and combinations of two or more thereof;
   $R^{10}$ may be the same or different and is independently selected from benzene and R-substituted benzene, and the substituted benzene group being substituted with from one to six substituents independently chosen from an alkyl, an aryl, an aralkyl, an amino, an alkoxy, an aryloxy, an alkylthio, an arylthio, a silyl, a germyl, a halo, a cyano, a hydrocarbyloxy, and combinations of two or more thereof;
   $R^{11}$ is either a coordinated ligand, a counterion, or both, and is independently selected from a hydride, an alkyl, a cycloalkyl, a $\eta^1$-cyclopentadienyl, a $\eta^3$-cyclopentadienyl, a $\eta^5$-cyclopentadienyl, a carbonyl, an acetylacetonate, an acetoacetate, a cyanide, an amide, a carboxamide, a sulfonamide, a bis(sulfonyl)amide, an azide, a nitrosyl, an oxo, a hydroxy, an alkoxide, a siloxide, an aryloxide, a carboxylate, a sulfonate, a halide, a sulfide, a mercaptan, a sulfoxide, a phosphonite, a phosphate, a phosphite, a nitrate, a sulfate, a sulfite, an arylborate, a fluoroborate, a fluorophosphate, a fluoroantimonate, a chlorate, a bromate, an iodate, an alkoxyaluminum, a hydroxoaluminate, or a cyanometallate, and may be the same or different
   k+p=m, k is 0 to 2, 1 is 0 to 2, p is 0 to 1;
   q+s=m, q is 0 or 1, r is 0 or 1, s is 1 to 4, t is from 0 to 5, with the proviso that q and r cannot both be 1;
   u+2=m, v is 0 to 10, u is 0 to 4;
   m is the oxidation state of metal atom M; and
   L is a neutral ligand.

2. The composition of claim 1, comprising the metal-arene complex of the formula $[(R^9)_k(R^{10})_l M'^{(m)}][R^{11}]_p$.

3. The composition of claim 2, where two $R^9$ groups, an $R^9$ and an $R^{10}$ group, an $R^9$ and an $R^{11}$ group, two $R^{10}$ groups, an $R^{10}$ and an $R^{11}$ group, or two $R^{11}$ groups are connected by at least one carbon- or silicon-based bridge such that they form a multidentate ligand.

4. The composition of claim 1, comprising the metal-arene complex of the formula:

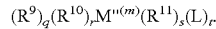

5. The composition of claim 4, wherein combinations of an $R^9$ and an $R^{11}$ group, an $R^9$ and an L group, an $R^{10}$ and an $R^{11}$ group, an $R^{10}$ and an L group, two $R^{11}$ groups, an $R^{11}$ group and an L group, or two L groups are connected by at least one carbon- or silicon-based bridge such that they form a multidentate ligand.

6. The composition of claim 1 comprising the metal-arene complex of the formula:

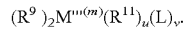

7. The composition of claim 6, wherein combinations of two $R^9$ groups, two $R^{11}$ groups, an $R^{11}$ and an L group, or two L groups are connected by at least one carbon- or silicon-based bridge such that they form a multidentate ligand.

8. The composition of claim 1 comprising from about 0.001 to about 10 parts per weight of accelerator (C) per 100 parts per weight of the polymer (A).

9. The composition of claim 1 comprising from about 0.1 to about 5 wt. pt. of accelerator (C) per 100 parts of the polymer A.

10. The composition of claim 1, wherein the accelerator (C) is substantially free of tin.

11. The polymer composition of claim 1, wherein the polymer (A) has the formula (1):

$$[R^1_a R^2_{3-a} Si-Z-]_n-X-Z-SiR^1_a R^2_{3-a} \quad (1)$$

where X is chosen from a polyurethane; a polyester; a polyether; a polycarbonate; a polyolefin; a polyesterether; and a polyorganosiloxane having units of $R_3SiO_{1/2}$, $R_2SiO$, $RSiO_{3/2}$, and/or $SiO_2$;
n is 0 to 100; a is 0 to 2; $R^1$ can be identical or different at the same Si-atom and chosen from a $C_1$-$C_{10}$ alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof; $R^2$ is chosen from OH, $C_1$-$C_8$ alkoxy, $C_2$-$C_{18}$ alkoxyalkyl, oximoalkyl, enoxyalkyl, aminoalkyl, carboxyalkyl, amidoalkyl, amidoaryl, carbamatoalkyl, or a combination of two or more thereof; and Z is a bond, a divalent unit selected from the group of a $C_1$-$C_8$ alkylene, or O.

12. The polymer composition of claim 1 wherein the polymer component (A) has the formula (2):

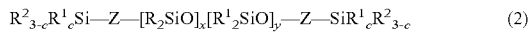

$$R^2_{3-c} R^1_c Si-Z-[R_2SiO]_x[R^1_2SiO]_y-Z-SiR^1_c R^2_{3-c} \quad (2)$$

where $R^1$ can be identical or different at the same Si-atom and chosen from a $C_1$-$C_{10}$ alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof; $R^2$ is chosen from OH, $C_1$-$C_8$ alkoxy, $C_2$-$C_{18}$ alkoxyalkyl, oximoalkyl, enoxyalkyl, aminoalkyl, carboxyalkyl, amidoalkyl, amidoaryl, carbamatoalkyl, or a combination of two or more thereof Z is a bond, a divalent unit selected from the group of a $C_1$-$C_8$ alkylene, or O; R is $C_1$-$C_6$ alkyl (an exemplary alkyl being methyl); x is 0 to about 10,000, in one embodiment from 11 to about 2500; and y is 0 to about 10,000; preferably 0 to 500 In one embodiment, Z in a compound of formula (2) is a bond or a divalent $C_1$-$C_{14}$ alkylene group, especially preferred is $-C_2H_4-$.

13. The polymer component (A) has the formula (3):

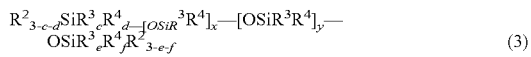

$$R^2_{3-c-d} SiR^3_c R^4_d-[OSiR^3 R^4]_x-[OSiR^3 R^4]_y-OSiR^3_e R^4_f R^2_{3-e-f} \quad (3)$$

where x is 0 to 10000; y is 0 to 1000; c, d, and f are independently chosen from 0 to 2; $R^1$ is chosen from a $C_1$-$C_{10}$ alkyl; a $C_1$-$C_{10}$ alkyl substituted with one or more of Cl, F, N, O, or S; a phenyl; a $C_7$-$C_{16}$ alkylaryl; a $C_7$-$C_{16}$ arylalkyl; a $C_2$-$C_4$ polyalkylene ether; or a combination of two or more thereof, and other siloxane units may be present in amounts less than 10 mol. % preferably methyl, vinyl, phenyl; $R^2$ is chosen from OH, a $C_1$-$C_8$ alkoxy, a $C_2$-$C_{18}$ alkoxyalkyl, an oximoalkyl, an oximoaryl, an enoxyalkyl, an enoxyaryl, an aminoalkyl, an aminoaryl, a carboxyalkyl, a carboxyaryl, an amidoalkyl, an amidoaryl, a carbamatoalkyl, a carbamatoaryl, or a combination of two or more thereof; and Z is $-O-$, a bond, or $-C_2H_4-$; and $R^3$ and $R^4$ can be identical or different on the same silicon atom and are chosen from hydrogen; $C_1$-$C_{10}$ alkyl; $C_1$-$C_{10}$ heteroalkyl; $C_3$-$C_{12}$ cycloalkyl; $C_2$-$C_{30}$ heterocycloalkyl; $C_6$-$C_{13}$ aryl; $C_7$-$C_{30}$ alkylaryl; $C_7$-$C_{30}$ arylalkyl; $C_4$-$C_{12}$ heteroaryl; $C_5$-$C_{30}$ heteroarylalkyl; $C_5$-$C_{30}$ heteroalkylaryl; $C_2$-$C_{100}$ polyalkylene ether; or a combination of two or more thereof.

14. The composition of claim 1, wherein the polymer (A) is chosen from silylated polyurethane (SPUR), silylated polyester, silylated polyether, silylated polycarbonate, silylated polyolefins silylated polyesterether and combinations of two or more thereof.

15. The composition of claim 14, wherein the silylated polyolefins are chosen from polyethylene and polypropylene.

16. The composition of claim 1, wherein the crosslinker or chain extender (B) is chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alklarylaminosiloxane, an alkoxycarbamatosilane, an alkoxycarbamatosiloxane, or a combination of two or more thereof.

17. The composition of claim 1, wherein the crosslinker or chain extender (B) is chosen from tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoximo)silane; vinyltris(methylethylketoximo)silane; 3,3,3-trifluoropropyltris(methylethylketoximo)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methymethoxybis(ethymethylketoximo)silane; methyldimethoxy(acetaldoxime)silane; methyldimethoxy(N-methylcarbamato)silane; ethyldimethoxy(N-methylcarbamato)silane; methyldimethoxyisopropenoxysilane; trimethoxyisopropenoxysilane; methyltriisopropenoxysilane; methyldimethoxy(but-2-en-2-oxy)silane; methyldimethoxy(1-phenylethenoxy)silane; methyldimethoxy-2-(1-carboethoxypropenoxy)silane; methylmethoxydi(N-methylamino)silane; vinyldimethoxy(methylamino)silane; tetra-N,N-diethylaminosilane; methyldimethoxy(methylamino)silane; methyltri(cyclohexylamino)silane; methyldimethoxy(ethylamino)silane; dimethyldi(N,N-dimethylamino)silane; methyldimethoxy(isopropylamino)silane; dimethyldi(N,N-diethylamino)silane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N -methylbenzamido)silane; methylmethoxybis (N-methylacetamido)silane; methyldimethoxy(caprolactamo)silane; trimethoxy(N-methylacetamido)silane; methyldimethoxy(ethylacetimidato)silane; methyldimethoxy(propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxyisothiocyanatosilane; methylmethoxydiisothiocyanatosilane, the condensates thereof, or a combination of two or more thereof.

18. The composition of claim 1 comprising an adhesion promoter component (D), chosen from an (aminoalkyl)trialkoxysilane, an (aminoalkyl)alkyldialkoxysilane, a bis(trialkoxysilylalkyl)amine, a tris(trialkoxysilylalkyl)amine, a tris(trialkoxyilylalkyl)cyanurate, a tri s(trialkoxysilylalkyl) isocyanurate, an (epoxyalkyl)alkyldialkoxysilane, an (epoxyalkyl)trialkoxysilane, or a combination of two or more thereof.

19. The composition of claim 1 comprising a filler component (E).

20. The composition of claim 1, wherein the composition is a two-part composition comprising: (i) a first portion comprising the polymer component (A), optionally a filler component (E), and optionally an acidic compound (F); and (ii) a second portion comprising the crosslinker (B), the accelerator (C), an adhesion promoter (D), and the acidic compound (F), whereby (i) and (ii) are stored separately until applied for curing by mixing of the components (i) and (ii).

21. A cured polymer formed from the composition of claim 1.

22. The curable polymer of claim 21 in the form of an elastomeric seal, duromeric seal, an adhesive, a coating, an encapsulant, a shaped article, a mold, an impression material, an optical material, or a silicone foam.

* * * * *